(12) United States Patent
Peyghambarian et al.

(10) Patent No.: US 8,885,139 B2
(45) Date of Patent: Nov. 11, 2014

(54) ADAPTIVE ELECTRO-ACTIVE LENS WITH VARIABLE FOCAL LENGTH

(75) Inventors: Nasser Peyghambarian, Tucson, AZ (US); Guoqiang Li, Tucson, AZ (US); Pekka Ayras, Helsinki (FI)

(73) Assignee: Johnson & Johnson Vision Care, Jacksonville, FL (US)

( * ) Notice: Subject to any disclaimer, the term of this patent is extended or adjusted under 35 U.S.C. 154(b) by 883 days.

(21) Appl. No.: 11/334,005

(22) Filed: Jan. 18, 2006

(65) Prior Publication Data

US 2006/0164593 A1  Jul. 27, 2006

Related U.S. Application Data

(60) Provisional application No. 60/645,839, filed on Jan. 21, 2005.

(51) Int. Cl.
*G02F 1/13* (2006.01)
*G02F 1/1335* (2006.01)

(52) U.S. Cl.
USPC ............................................. 349/200; 349/13

(58) Field of Classification Search
USPC .................................. 349/123–136, 200, 13
See application file for complete search history.

(56) References Cited

U.S. PATENT DOCUMENTS

| | | |
|---|---|---|
| 3,161,718 A | 12/1964 | de Luca |
| 3,245,315 A | 4/1966 | Marks et al. |
| 3,309,162 A * | 3/1967 | Kosanke et al. ............. 359/319 |
| 4,181,408 A | 1/1980 | Senders |
| 4,190,330 A | 2/1980 | Berreman |
| 4,205,311 A | 5/1980 | Kutaragi |
| 4,279,474 A | 7/1981 | Belgorod |
| 4,300,818 A | 11/1981 | Schachar |
| 4,303,913 A | 12/1981 | Tohda et al. |
| 4,319,484 A | 3/1982 | Keller |
| 4,373,218 A | 2/1983 | Schachar |
| 4,382,659 A | 5/1983 | Aoki et al. |
| 4,386,836 A | 6/1983 | Aoki et al. |
| 4,466,703 A | 8/1984 | Nishimoto |
| 4,564,267 A | 1/1986 | Nishimoto |
| 4,572,616 A | 2/1986 | Kowel et al. |
| 4,601,545 A | 7/1986 | Kern |
| 4,671,618 A | 6/1987 | Wu et al. |
| 4,756,605 A | 7/1988 | Okada et al. |
| 4,795,248 A | 1/1989 | Okada et al. |

(Continued)

FOREIGN PATENT DOCUMENTS

| | | |
|---|---|---|
| EP | 0233104 | 8/1987 |
| EP | 0237365 | 9/1987 |

(Continued)

OTHER PUBLICATIONS

Naumov et al., "Control Optimization of Spherical Modal Liquid Crystal Lenses", Optics Express, vol. 4, No. 9, pp. 344-352, Apr. 26, 1999.

(Continued)

*Primary Examiner* — Jessica M Merlin
(74) *Attorney, Agent, or Firm* — Cahn & Samuels, LLP

(57) ABSTRACT

An adjustable focusing electrically controllable electroactive lens is provided. The adjustable focusing electrically controllable electroactive lens can adjust the focal length discretely or continuously. The lens can be incorporated in a variety of optical devices including spectacles.

8 Claims, 8 Drawing Sheets

(56) References Cited

U.S. PATENT DOCUMENTS

| | | | |
|---|---|---|---|
| 4,836,652 A | 6/1989 | Oishi et al. | |
| 4,904,063 A | 2/1990 | Okada et al. | |
| 4,909,626 A * | 3/1990 | Purvis et al. | 356/332 |
| 4,919,520 A | 4/1990 | Okada et al. | |
| 4,921,728 A | 5/1990 | Takiguchi et al. | |
| 4,927,241 A | 5/1990 | Kuijk | |
| 4,981,342 A | 1/1991 | Fiala | |
| 4,991,951 A | 2/1991 | Mizuno et al. | |
| 5,040,876 A * | 8/1991 | Patel et al. | 349/128 |
| 5,066,301 A | 11/1991 | Wiley | |
| 5,067,795 A | 11/1991 | Senatore | |
| 5,073,021 A | 12/1991 | Marron | |
| 5,091,801 A | 2/1992 | Ebstein | |
| 5,142,411 A | 8/1992 | Fiala | |
| 5,150,234 A | 9/1992 | Takahashi et al. | |
| 5,150,241 A | 9/1992 | Joffre et al. | |
| 5,155,476 A | 10/1992 | Shioji | |
| 5,359,444 A | 10/1994 | Piosenka et al. | |
| 5,375,006 A | 12/1994 | Haas | |
| 5,382,986 A | 1/1995 | Black et al. | |
| 5,440,357 A | 8/1995 | Quaglia | |
| 5,451,766 A | 9/1995 | Van Berkel | |
| 5,552,841 A | 9/1996 | Gallorini et al. | |
| 5,615,588 A | 4/1997 | Gottschald | |
| 5,682,223 A | 10/1997 | Menezes et al. | |
| 5,712,721 A | 1/1998 | Large | |
| 5,815,233 A | 9/1998 | Morokawa et al. | |
| 5,861,936 A | 1/1999 | Sorenson | |
| 5,877,876 A * | 3/1999 | Birdwell | 349/39 |
| 5,949,521 A | 9/1999 | Williams et al. | |
| 6,086,204 A | 7/2000 | Magnante | |
| 6,095,651 A | 8/2000 | Williams et al. | |
| 6,191,881 B1 * | 2/2001 | Tajima | 359/254 |
| 6,305,802 B1 | 10/2001 | Roffman et al. | |
| 6,437,762 B1 | 8/2002 | Birdwell | |
| 6,437,925 B1 | 8/2002 | Nishioka | |
| 6,464,363 B1 | 10/2002 | Nishioka et al. | |
| 6,609,794 B2 | 8/2003 | Levine | |
| 6,619,799 B1 | 9/2003 | Blum et al. | |
| 6,626,532 B1 | 9/2003 | Nishioka et al. | |
| 6,631,001 B2 | 10/2003 | Kuiseko | |
| 6,768,536 B2 | 7/2004 | Okuwaki et al. | |
| 6,778,246 B2 | 8/2004 | Sun et al. | |
| 6,859,333 B1 * | 2/2005 | Ren et al. | 359/721 |
| 7,019,890 B2 | 3/2006 | Meredith et al. | |
| 7,209,097 B2 | 4/2007 | Suyama et al. | |
| 7,264,354 B2 | 9/2007 | Blum et al. | |
| 7,388,565 B2 | 6/2008 | Khurana et al. | |
| 8,154,804 B2 | 4/2012 | McGinn et al. | |
| 2002/0145701 A1 * | 10/2002 | Sun et al. | 349/200 |
| 2003/0210377 A1 | 11/2003 | Blum et al. | |
| 2004/0057096 A1 | 3/2004 | Amada et al. | |
| 2004/0105038 A1 * | 6/2004 | Hashimoto et al. | 349/5 |
| 2004/0108971 A1 | 6/2004 | Waldern et al. | |
| 2004/0108984 A1 * | 6/2004 | Ogasawara | 345/87 |
| 2005/0116908 A1 | 6/2005 | Mi et al. | |
| 2005/0185135 A1 | 8/2005 | Blum et al. | |
| 2005/0231677 A1 | 10/2005 | Meredith | |
| 2006/0012594 A1 | 1/2006 | Worley et al. | |
| 2006/0022919 A1 | 2/2006 | Martinot-Lagarde et al. | |
| 2006/0082559 A1 | 4/2006 | Louwsma et al. | |
| 2006/0092340 A1 | 5/2006 | Blum et al. | |
| 2006/0109226 A1 | 5/2006 | Tyrrell et al. | |
| 2006/0164593 A1 | 7/2006 | Peyghambarian et al. | |
| 2006/0256244 A1 | 11/2006 | Jak et al. | |
| 2006/0256271 A1 | 11/2006 | Shimoshikiryo | |
| 2007/0052920 A1 | 3/2007 | Stewart et al. | |
| 2009/0015785 A1 | 1/2009 | Blum et al. | |
| 2011/0028028 A1 | 2/2011 | Iwasaki et al. | |

FOREIGN PATENT DOCUMENTS

| | | | |
|---|---|---|---|
| EP | 0258996 | 3/1988 | |
| JP | 62129815 | 6/1987 | |
| JP | 63-249125 | 10/1988 | |
| JP | 4-240817 | 8/1992 | |
| JP | 05100201 | 4/1993 | |
| JP | 5-36327 | 5/1993 | |
| JP | 9-304748 | 11/1997 | |
| JP | 09304748 A * | 11/1997 | G02F 1/13 |
| JP | 10366043 | 12/1998 | |
| JP | 2000-223766 | 8/2000 | |
| JP | 2002-148581 | 5/2002 | |
| JP | 2002148581 | 5/2002 | |
| JP | 2002357804 | 12/2002 | |
| JP | 2004-101885 | 4/2004 | |
| JP | 2005-24917 | 1/2005 | |
| JP | 2005-302248 | 10/2005 | |
| JP | 2006-145957 | 6/2006 | |
| KR | 10-2004-0053147 | 6/2004 | |
| TW | 200421201 A | 10/2004 | |
| WO | WO 92/01417 | 2/1992 | |
| WO | WO 98/27863 | 7/1998 | |
| WO | WO 99/27334 | 6/1999 | |
| WO | WO 03/032066 A1 | 4/2003 | |
| WO | WO 2005/101111 | 10/2005 | |
| WO | WO 2006/054803 | 5/2006 | |

OTHER PUBLICATIONS

Kotova et al., "Modal Liquid Crystal Wavefront Corrector", Optics Express, vol. 10, No. 22, pp. 1258-1272, Nov. 4, 2002.

Vdovin et al., "On the Possibility of Intraocular Adaptive Optics", Optics Express, vol. 11, No. 7, pp. 810-817, Apr. 7, 2003.

International Search Report for International Application No. PCT/US07/76994, mailed on Jun. 10, 2008.

International Search Report for International Application No. PCT/US09/38212, mailed on Jul. 1, 2009.

International Search Report for International Application No. PCT/US2007/070827, mailed on Dec. 31, 2008.

Office Action for U.S. Appl. No. 11/846,324, mailed on Jun. 11, 2009.

Supplementary European Search Report for European Application No. EP 06733755 completed on Mar. 16, 2010.

Office Action issued for ROC (Taiwan) Patent Application No. 095102252, issued on Feb. 27, 2013 and an English translation thereof.

Office Action issued for Taiwanese Patent Application No. 095102252, issued on Jun. 17, 2013, and an English translation thereof.

Office Action issued for Japanese Patent Application No. 2012-223409, mailed on Aug. 27, 2013.

Battiato et al., "Free Space Digital Optical Processor," Rome Laboratory, Air Force Materiel Command, Griffiss Air Force Base, New York, RL-TR-95-74 In-House Report, pp. 9-16 (Apr. 1995).

"Focusing by Electrical Modulation of Refraction in a Liquid Crystal Cell"; Stephen T. Kowell, et al., *Applied Optics*, vol. 23, No. 2, Jan. 15, 1984, pp. 278-289.

"Vision Through a Liquid-Crystal Spatial Light Modulator"; Larry N. Thibos, et al., *Inpress*, Adaptive Optics Conference, Durham, United Kingdom, 1999.

"Requirements for Segmented Spatial Light Modulators for Diffraction-Limited Imaging Through Aberrated Eyes"; Larry N. Thibos, et al., *Inpress*, Adaptive Optics Conference, Durham, United Kingdom, 1999.

"Use of Liquid-Crystal Adaptive-Optics to Alter the Refractive State of the Eye"; Larry N. Thibos, et al., *Optometry and Vision Science*, vol. 74 No. 7, Jul. 1997.

"Electronic Spectacles for the 21st Century"; *Indiana Journal of Optometry*, vol. 2, No. 1, 1999.

"Adaptive Optics: Liquid Crystals Lower the Cost of Adaptive Optic"; M. Anderson, *Laser Focus World*, Dec. 1999, pp. 1-3.

"Control Optimization of Spherical Modal Liquid Crystal Lenses"; A.F. Naumov & G.D. Love, *Optics Express*, vol. 4, No. 9, pp. 344-352, Apr. 26, 1999.

"Liquid Crystal Adaptive Lenses with Modal Control"; A.F. Naumov & M.Yu Loktev, *Optics Letters*, vol. 23, No. 13, Jul. 1, 1998, pp. 992-994.

(56) References Cited

OTHER PUBLICATIONS

"Liquid Lenses Eye Commercial Breakthrough"; (Internet Article under "Optics.org") from *Opto & Laser*, Nov. 2003.

"Variable Focal Length Microlenses"; L.G. Commander, et al; *Optics Communications*, May 15, 2000, 14 pgs.

"On the Possibility of Intraocular Adaptive Optics"; Gleb Vdovin, et al., *Optics Express*, vol. 11, No. 7, Apr. 7, 2003, 8 pgs.

"Electrically controlled Polarization-Independent Liquid-Crystal Fresnel Lens Arrays"; J.S. Patel, et al., *Optics Letters*, vol. 16, No. 7, Apr. 1, 1991, 3 pgs.

"Tunable Fresnel Lens Using Nanoscale Polymer-Dispersed Liquid Crystals"; Hongwen Ren, et al., *Applied Physics Letters*, vol. 83, No. 8, Aug. 25, 2003, 3 pgs.

"Adaptive Spherical Lens"; Stephen T. Kowel, et al., *Applied Optics*, vol. 23 No. 16, Aug. 15, 1984, 4 pgs.

"Wave Front Control Systems Based on Modal Liquid Crystal Lenses"; M. Yu Loktev, et al., *Review of Scientific Instruments*, vol. 71, No. 9, Sep. 2000, 8 pgs.

"Liquid-Crystal Microlens with a Beam-Steering Function"; Shin Masuda, et al., *Applied Optics*, vol. 36, No. 20, Jul. 10, 1997, 7 pgs.

"Three-Terminal Adaptive Nematic Liquid-Crystal Lens Device"; Nabeel A. Riza, et al., *Optical Society of America*, Mar. 16, 1994, 3 pgs.

"A Switchable Liquid Crystal Binary Gabor Lens"; P.W. McOwan, et al., *Optics Communications*, vol. 103, No. 3,4, Nov. 15, 1993, 5 pgs.

\* cited by examiner

ADAPTIVE ELECTRO-ACTIVE LENS WITH VARIABLE FOCAL LENGTH

CROSS-REFERENCE TO RELATED APPLICATIONS

This application claims priority to U.S. Provisional Application No. 60/645,839 filed Jan. 21, 2005, which is incorporated herein by reference in its entirety.

BACKGROUND OF THE INVENTION

Correction of age-related optical changes in the eye becomes increasingly important as the life expectancy continues to increase. One age-related optical change in the eye is presbyopia, where people have difficulty in focusing close objects onto the retina because of decreased lens flexibility. Presbyopia usually begins to affect people in their forties, so there is a significant need for this vision correction. Ophthalmic lenses with fixed focusing properties have been widely used as spectacles and contact lenses to correct presbyopia and other conditions.

Ophthalmic lenses are most useful if they have adjustable focusing power (i.e., the focusing power is not static). Adjustable focusing power provides the eye with an external accommodation to bring objects of interest at different distances into focus. Adjustable focusing power can be achieved using a mechanical zoom lens. However, the mechanical approach makes the spectacle bulky and costly.

Different optical techniques have been exploited in bifocal lenses to allow both near and distance vision. For example, the user may have lenses providing different focusing power to each eye, one for near objects and the other for distant objects. Alternatively, by use of area division of the lens, bifocal diffractive lens or other division techniques, both near and distant objects are imaged onto the retina simultaneously and the brain distinguishes the images. Except for the bifocal diffractive lens, the field of view using these optical techniques is small. Furthermore, these optical techniques do not work well when the pupil is small, since the iris blocks the beam that passes through the annular portion of the lens. Another option for correction is the use of monovision lenses, where different focusing power is provided to each eye, one for near objects and the other for distant objects. However, the binocular depth perception is affected when monovision lenses are used.

Electrically switchable lenses (for example lenses having a layer of liquid crystal sandwiched between two conductive plates where the orientation of the liquid crystal changes upon application of an electric field) have been described for use in optical systems (see, for example, Kowel, Appl. Opt. 23(16), 2774-2777 (1984); Dance, Laser Focus World 28, 34 (1992)). In electrically switchable lenses, various electrode configurations have been studied, including Fresnel zone plate electrode structures (Williams, SPIE Current Developments in Optical Engineering and Commercial Optics, 1168, 352-357 (1989); McOwan, Optics Communications 103, 189-193 (1993)). Variable focal length liquid crystal lenses have been described (Sato, Jap. J. Appl. Phys. 24(8), L626-L628 (1985)). However the use of liquid crystal lenses in spectacle lens applications is limited due to many factors, including low diffraction efficiency when the focal length is changed and slow switching times resulting from the required thickness of the liquid crystal layer. An improved lens with adjustable focusing power is needed.

SUMMARY OF THE INVENTION

A new lens design and corresponding device and method for adjusting the focal length of a lens is provided. The new design is based on an individually addressable electrode pattern. Described here are two applications of the new design. The first application allows switching the focal length between discrete values. In one embodiment, the focal length is switched between an initial focal length and integer multiples of the initial focal length. The second application allows a more general use, where the focal length is continuously adjusted from the minimum possible value based on the design parameters to infinity. The new design overcomes the difficulties described above.

More specifically, provided is an adjustable focusing electrically controllable electroactive lens. Also provided are methods for discretely or continuously adjusting the focal length of an electrically controllable electroactive lens. Electrically controllable electroactive lenses allow the focal length to be adjusted without bulky and inefficient mechanical movement. In contrast to the simultaneous vision lenses such as bifocal, trifocal, or progressive eyeglasses or contact lenses, in which the field of view for each vision is limited to a narrow corridor and the user is confronted with two images, and the monovision lenses in which the binocular depth perception is affected, the electro-active adjusts the focusing power and at each working condition the whole aperture has the same focusing power. Devices made from the adjustable focusing electrically controllable lenses provide adjustable focusing with a large field of view and high image quality without the need to switch between different physical lenses. Other advantages of this lens include compact, lighter weight, low cost, and easier operation with low voltages and low power dissipation.

In one embodiment, an adjustable focusing electrically controllable electroactive lens is provided comprising: a liquid crystal layer positioned between a pair of transparent substrates; a Fresnel zone patterned electrode having M zones, each zone having L individually addressable subzones positioned between the liquid crystal layer and the inward-facing surface of the first transparent substrate, where M and L are positive integers; and a conductive layer between the liquid crystal layer and the inward-facing surface of the second transparent substrate. The individually addressable subzones of the Fresnel zone patterned electrode can be on the same horizontal plane, in which the subzones are separated by an insulator to prevent electrical shorting, or the individually addressable subzones of the Fresnel zone patterned electrode can be positioned on two or more horizontal planes, each separated by an insulating layer, or other configurations can be used as known in the art.

A method of adjusting the focal length of a lens by integer multiples of an original focal length F is provided comprising: providing a lens comprising a liquid crystal layer enclosed between a pair of transparent substrates; a Fresnel zone patterned electrode positioned between the liquid crystal layer and the inward-facing surface of the first transparent substrate, said patterned electrode having M zones, each zone having L subzones, said patterned electrode having a total of M·L individually addressable electrodes; a conductive layer between the liquid crystal layer and the inward-facing surface of the second transparent substrate; and an electrical control electrically connected to the electrode zones and the conductive layer; applying the same voltage to each k individually addressable electrodes to adjust the focal length to kF, where k is an integer from 1 to ML. The focal length can be discretely tuned from F to infinity.

A method of continuously adjusting the focal length of a lens is provided comprising: (a) providing a lens comprising a liquid crystal layer enclosed between a pair of transparent substrates; a Fresnel zone patterned electrode having L diffraction levels positioned between the liquid crystal layer and the inward-facing surface of the first transparent substrate, said patterned electrodes being a circular array of individually addressable rings; a conductive layer between the liquid crystal layer and the inward-facing surface of the second transparent substrate; and an electrical control electrically connected to the electrode zones and the conductive layer; (b) determining the desired focal length (f'); (c) calculating the area of the mth zone of the Fresnel zone patterned electrode using the equation:

$$r_m^2 + f'^2 = (f' + m\lambda)^2,$$

where f' is the design focal length, and $\lambda$ is the design wavelength, and $r_m$ is the radius of the mth subzone; (d) dividing the calculated area of the mth zone by L or a larger integer to determine the number of individually addressable electrodes that form a design subzone;
(e) applying the same voltage to the number of individually addressable electrodes in a design subzone. The method for continuously adjusting the focal length can further comprise before step (a): determining one or more design focal lengths; calculating the maximum ring size in the Fresnel zone patterned electrode that allows all design focal lengths to be formed in a design subzone.

In one embodiment, the electrode zones are formed from patterned ITO (Indium Tin Oxide) electrodes. The phase retardation in each zone is modulated by reorientation of the liquid crystal using applied electrical fields, as known in the art.

The adjustable focusing electrically controllable electroactive lens described herein provides many advantages over current approaches. One advantage is the ability to adjustably change the focusing power of the lens. The focal length of a diffractive lens is determined by the electrode zone spacing. In the lenses described herein, the electrode pattern is fixed and the focal length can be changed directly by changing the electronic driving connections to the electrodes and the voltage applied. In one embodiment, the individually addressable electrode zones allow correction for different distance vision, including near—(e.g., reading), intermediate—(e.g., computer screen) and distance vision. The focusing power can be adjusted either directly by a range finder or manually by the user. In one embodiment, microelectronic circuits are integrated with the lens, so the assembly is compact. Also, the electrode structure is invisible, which provides a cosmetic advantage over the terraced liquid crystal approach. A loss of electrical power will not affect the distance vision (the focusing power provided when no current is provided). At each working condition the entire aperture has the same focusing power. The Fresnel zone structure described herein in one embodiment allows relatively large apertures, which is required for ophthalmic lens applications. Other advantages of the invention described herein include a compact design, lighter weight, low cost, easier operation with low voltages and low power dissipation.

As known in the art, the focal length of the lenses described herein and the corresponding diopter values can be either positive or negative, depending on the voltages applied. These variations are known to one of ordinary skill in the art without undue experimentation and are included herein.

As used herein, "adjustable focusing" means the focal length of the lens is not fixed at one distance as in a conventional optical lens. The focal length of an adjustable focusing lens is adjusted by changing the voltage applied to electrodes by means known in the art. In one embodiment, the focal length is adjusted by the user to provide vision of an object at a desired distance. "Individually addressable" means the same or different voltage can be applied to different electrodes independently. "Electrically controllable" means a voltage is applied to control or change a parameter, such as the orientation state of a liquid crystal, as known in the art. "Continuously adjusting" means the focal length can be adjusted to many different values that are not strict multiples of the original focal length and does not necessarily mean that every different focal length is achievable, due to the physical limitations of the current patterned electrode fabrication techniques.

As used herein, "layer" does not require a perfectly uniform film. Some uneven thicknesses, cracks or other imperfections may be present, as long as the layer performs its intended purpose, as described herein. As used herein, "perpendicular" means approximately perpendicular to the surface of the substrate. Note that the optical axis generally is approximately perpendicular to the surface of the substrate. As used herein, "no horizontal gap" between electrodes includes the situation where the electrodes have no space between them when viewed in the perpendicular direction, and also includes the situation where there is a space between electrodes when viewed in the perpendicular direction that does not cause the diffraction efficiency of the optic to be reduced by more than 25% from the theoretical maximum, as well as all individual values and ranges therein.

The devices of the invention can be used in a variety of applications known in the art, including lenses used for human or animal vision correction or modification. The lenses can be incorporated in spectacles, as known in the art. Spectacles can include one lens or more than one lens. The devices may also be used in display applications, as known to one of ordinary skill in the art without undue experimentation. The lenses of the invention can be used with conventional lenses and optics. The lenses of the invention can be used as a portion of a conventional lens, for example as an insert in a conventional lens, or a combination of conventional lenses and lenses of the invention can be used in a stacked manner.

This invention is useful in preparing spectacles having lenses that adjust focusing strength based on distance from the object viewed. In one embodiment, a range-finding mechanism, battery and control circuitry are housed in the spectacles or are part of a separate control system. These components and their use are known in the art. As one example, the range-finding mechanism is used to determine the distance between the spectacle and a desired object. This information is fed to a microprocessor which adjusts the voltage applied to the individually addressable electrodes, which gives the lens the desired phase transmission function to view the object.

Various methods of applying voltage to the electrodes can be used, as known in the art. A battery can be used to supply the voltage, or other methods, as known in the art. It is known in the art that various methods of controlling all aspects of the voltage applied to electrodes can be used, including a processor, a microprocessor, an integrated circuit, and a computer chip. The voltage applied is determined by the desired phase transmission function, as known in the art.

DETAILED DESCRIPTION OF THE INVENTION

For better understanding of the invention, basic concepts of liquid crystal cells, as well as some basic concepts in diffractive lenses and the principle of the adaptive lens are briefly reviewed here.

Diffractive Lenses

Diffractive lenses are known in the art. The function of a diffractive lens is based on near-field diffraction by a Fresnel zone pattern. Each point emerging from the structure serves as an emitter of a spherical wave. The optical field at a particular observing point is a summation of the contributions of the emitted spherical waves over the entire structure. Constructive interference of the spherical waves coming from the various points creates a high intensity at the observation point, corresponding to a high diffraction efficiency.

Figure 1:
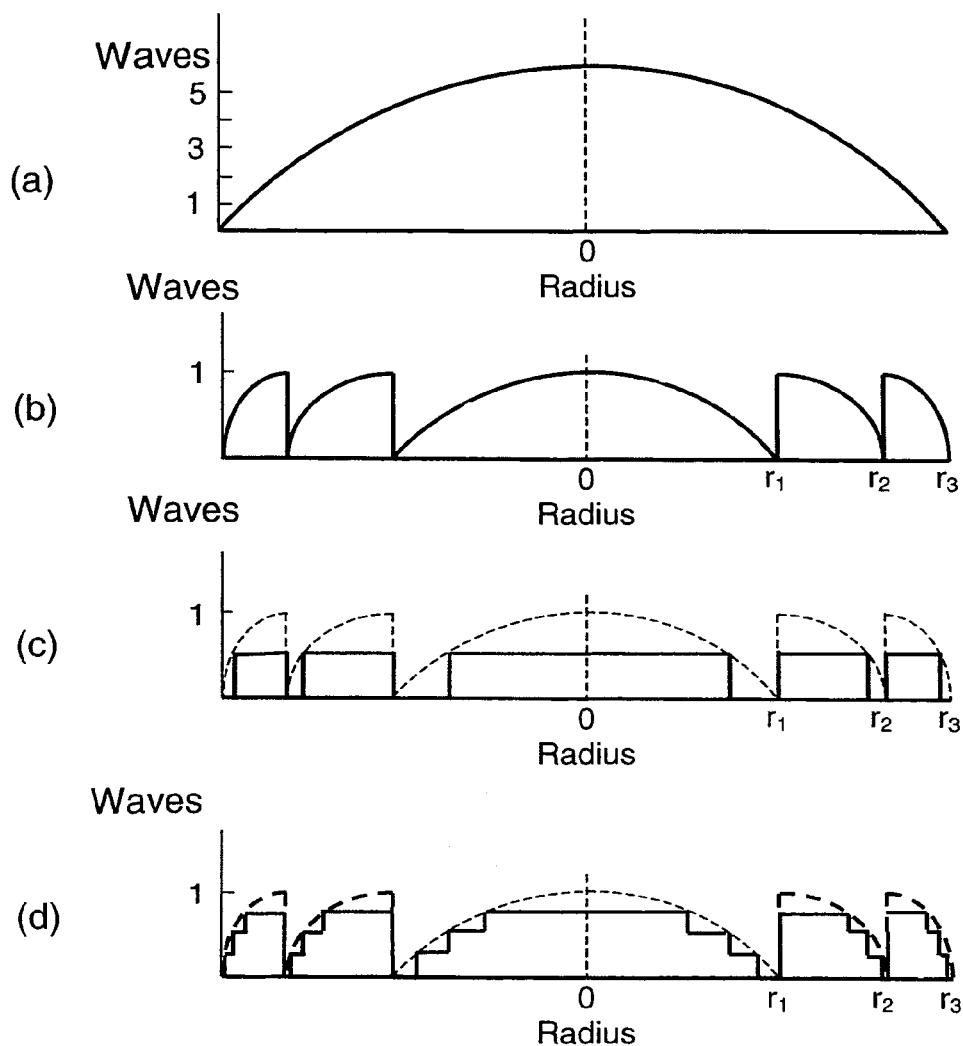
FIG. 1 shows an illustration of a diffractive lens: graph (a) is a conventional refractive lens; graph (b) is a diffractive lens with continuous quadratic blaze profile; graph (c) is a binary diffractive lens; and graph (d) is a four-level approximation of the diffractive lens.

FIG. 1 shows an illustration of a diffractive lens: graph (a) is a conventional refractive lens; graph (b) is a diffractive lens with continuous quadratic blaze profile; graph (c) is a binary diffractive lens; and graph (d) is a four-level approximation of the diffractive lens.

FIG. 1 graph (a) shows a part of a conventional refractive lens. By removing the multiple $2\pi$ phase retardation from the refractive lens, a diffractive lens is obtained as shown in FIG. 1 graph (b). The phase jump at each zone boundary is $2\pi$ for the design wavelength $\lambda_0$, and the blazing profile in each zone makes perfect constructive interference at the focal point. FIG. 1 graph (c) and FIG. 1 graph (d) show different approximations of the desired phase profile in FIG. 1 (b), wherein multiple steps in each zone are used to approximate the desired phase profile.

Figure 2:
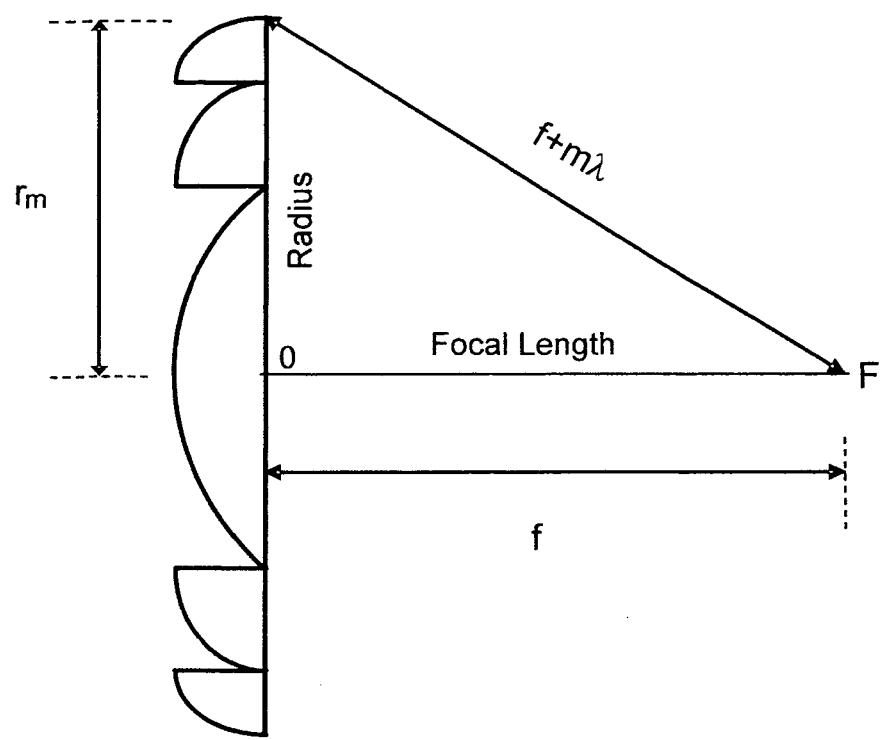
FIG. 2 shows a construction of a diffractive lens.

FIG. 2 shows a construction of a diffractive lens. The focal length (f) is displayed along the optical axis. The radius ($r_m$) is displayed perpendicular to the optical axis. Note that the path traveled by light entering the lens at radius ($r_m$) to reach the focal point F is equivalent to the focal length (f) plus an integer number of wavelengths ($m\lambda$) in order to have constructive interference.

In other words, the focal length (f) of the diffractive lens is determined by the period of the zones. The optical path length differences are multiples of the wavelength. For the mth zone, noting that $f+m\lambda$ is a hypotenuse of a right triangle in FIG. 2:

$$r_m^2 + f^2 = (f+m\lambda)^2. \quad (1)$$

For paraxial approximation, $f \gg m\lambda$, the radii (r) of the zones or the zone boundaries are given by $$r_m^2 = 2m\lambda f. \quad (2a)$$

where $r_m$ is the outer radius of the mth zone (m=1, 2, 3 ... M), $\lambda$ is the wavelength and f is the focal length. For L-level diffraction lens, each zone consists of L subzones of equal size (area). Note that there are L subzones and each of the subzones has a different optical thickness, thus there are L phase levels.

The outer radius of the nth sub zone (n=1, 2, 3 ... L, L is the number of phase levels in each zone) of the mth zone is given by $$r_m^n = \sqrt{2[(m-1)+n/L]\lambda f} \quad (2b)$$

This determines the Fresnel zone pattern, which is periodic in $r^2$. The period equals to $r_1^2$. Note that $r_1$ is the radius of the first zone, and that every zone has the same area. The focal length of the diffractive lens is $$f = \frac{r_1^2}{2\lambda}. \quad (3)$$

The above equations imply that the focal length can be changed by choosing the zone period. For a lens with the focal length p·f, the size (area) of each zone is $p \cdot r_1^2$.

The diffraction efficiency of a multi-level diffractive lens (or an L-phase level diffraction lens) is given by $$\eta = \mathrm{sinc}^2(1/L) = \left[\frac{\sin(\pi/L)}{\pi/L}\right]^2. \quad (4)$$

Table 1 gives various parameters for a 1-diopter diffractive lens. As seen in Table 1, the diffraction efficiency increases as the number of phase levels increases and the width of the last subzone decreases as the aperture of the lens increases.

TABLE 1

| Phase Levels | Diffraction Efficiency | Width of the last subzone in μm | |
|---|---|---|---|
| | | 10 mm aperture lens | 20 mm aperture lens |
| 2 | 40.5% | 56 | 28 |
| 4 | 81.1% | 28 | 14 |
| 6 | 91.2% | 19 | 9 |
| 8 | 95.0% | 14 | 7 |
| 16 | 98.7% | 7 | 3.5 |

Liquid Crystal Cells

Liquid crystal cells are known in the art. Many cell configurations and operations of liquid crystal cells are also known in the art.

Figure 3:
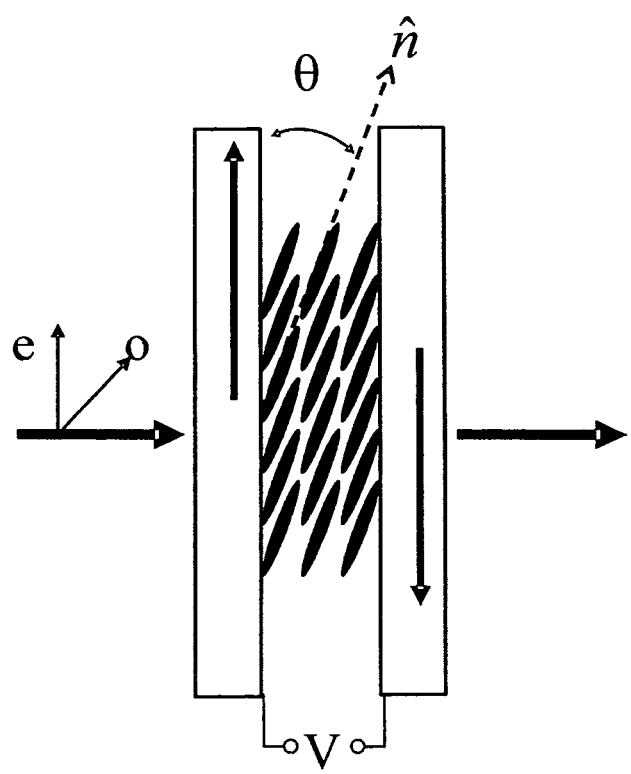
FIG. 3 shows a liquid crystal cell.

FIG. 3 shows an illustrative embodiment of an electro-active liquid crystal cell, where a layer of liquid crystal is sandwiched between two glass plates that have conductive inner surfaces. The surfaces of the plates are coated with an alignment layer such as polyvinylalcohol (PVA) or nylon 6,6 and are treated by rubbing to give a homogeneous molecular orientation. The alignment layers are buffed in the direction shown in the arrows, as known in the art. A voltage is applied to the inner conductive surfaces of the plates. In an electro-active cell using a liquid crystal as the electro-optic medium, every zone has the same thickness, but the refractive index of the extraordinary beam is changed due to the reorientation of the liquid crystal molecule when a voltage is applied to the medium. As shown in FIG. 3, the original orientation of the liquid crystal molecule is determined by the buffing direction. The long axis (optic axis) of the liquid crystal molecule is aligned vertically. When an appropriate voltage is applied, the molecule is rotated. The effective refractive index ($n_e'$) is given by $$n_e'(\theta) = \frac{n_o n_e}{\sqrt{(n_e^2 \sin^2\theta + n_o^2 \cos^2\theta)}}, \quad (5)$$

where $n_o$ and $n_e$ are the refractive indices for the ordinary and extraordinary beams, respectively, $\theta$ is the angle between the optic axis of the molecule and the vertical axis. The extraordinary beam initially has the maximum refractive index $n_e$. With the increase of the applied voltage, the effective refractive index $n_e'$ becomes smaller, and when a saturation voltage is applied, the optic axis of the molecule is aligned horizontally and the effective refractive index of $n_e'$ reaches the minimum and is equal to $n_o$. The refractive index for the ordinary beam (horizontally polarized) is always the same. So the electro-optic effect modulates the effective refractive index of the extraordinary beam.

In the liquid crystal cells described herein, the conductive material on one substrate does not form a homogeneous layer, rather a pattern of electrodes are formed, as further described herein.

Figure 4:
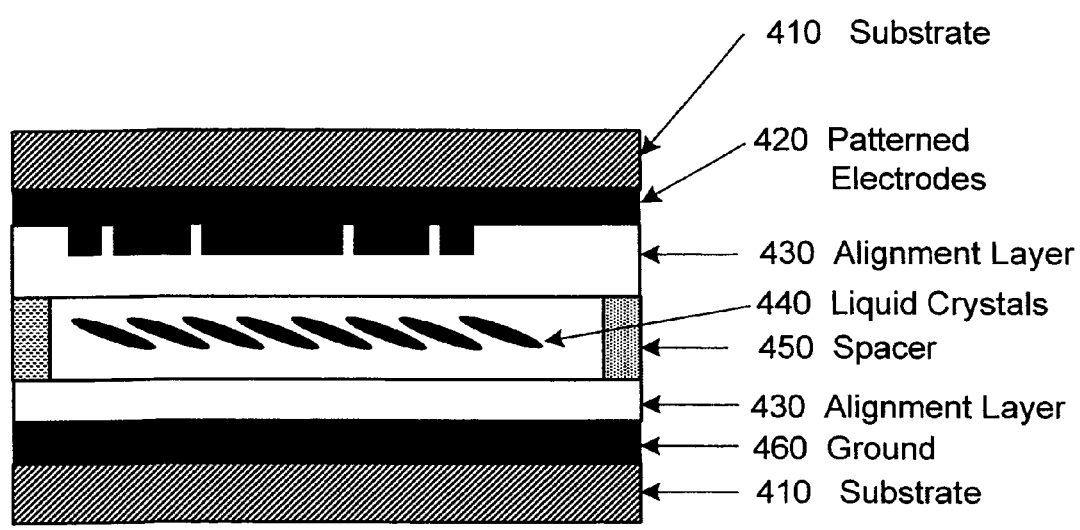
FIG. 4 shows general structure of an electro-active liquid crystal lens with patterned electrodes.

FIG. 4 illustrates the general structure of an electro-active liquid crystal lens with patterned electrodes. From top to bottom, the layers comprise:

410 Substrate,
420 Patterned Electrodes (individually controllable electrodes),
430 Alignment Layer,
440 Liquid Crystals and 450 Spacer (or Spacers),
430 Alignment Layer,
460 Ground, and
410 Substrate.

Specifically, FIG. 4 illustrates the general structure of the electro-active liquid crystal lens used herein. A liquid crystal layer 430 is sandwiched between a patterned electrodes 420 and a ground electrode 460. The patterned electrode 430 may be fabricated by photolithographic processing of a conductive film deposited on a glass substrate, as known in the art, and the ground electrode 460 contains a uniform conductive layer, formed in any manner as known in the art. The patterned electrodes comprise a circular array of rings whose radii are determined by the focal length desired, as described herein. The electro-optic effect of the liquid crystals 440 results in electrically controllable birefringence. The phase profile across the lens is tailored by applying proper voltages to the patterned electrodes, as further described herein.

The conductive material may be any suitable material, including those specifically described herein, and other materials known in the art. It is preferred that the conductive material be transparent, such as indium oxide, tin oxide or indium tin oxide (ITO). The substrate can be any material that can provide desired optical transmission and can function in the devices and methods described herein, such as quartz, glass or plastic, as known in the art. The thickness of the conducting layer is typically between 30 nm and 200 nm. The layer must be thick enough to provide adequate conduction, but not so thick as to provide excess thickness to the overall lens structure. The patterned electrodes 420 may be formed using photolithographic techniques, such as those described herein and known to one of ordinary skill in the art.

Figure 5A:
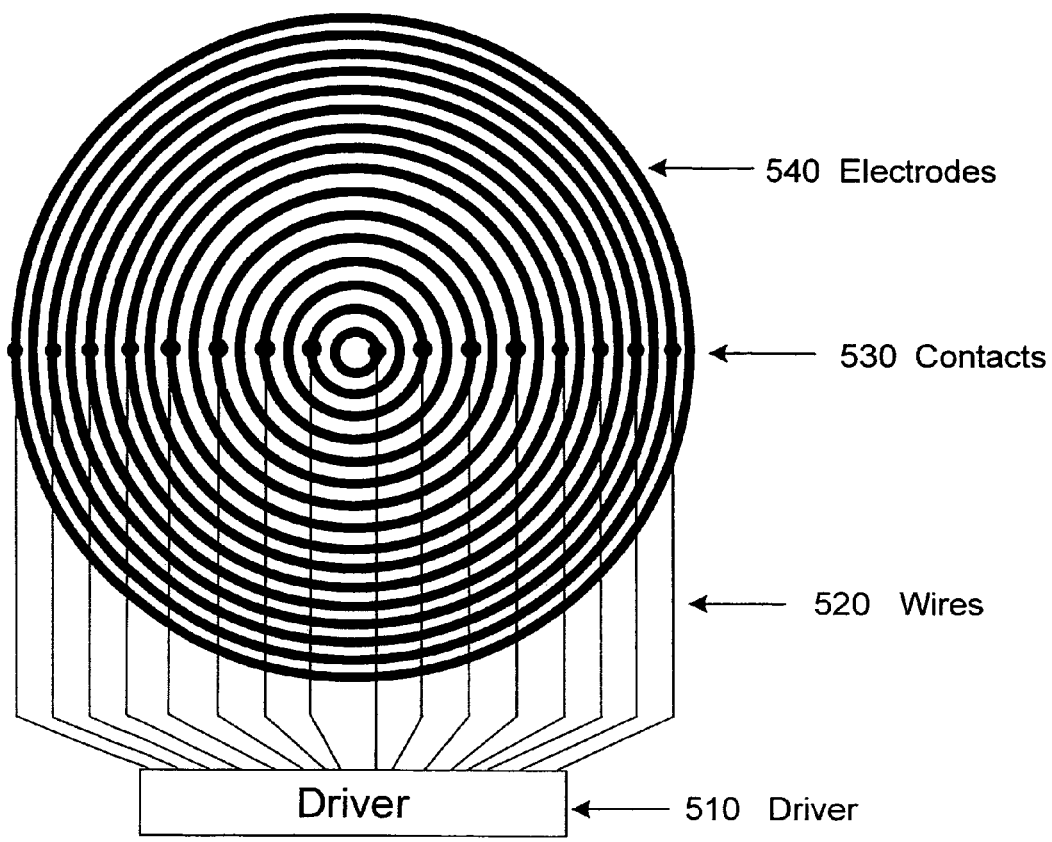
FIG. 5A illustrates a structure where all electrodes are on the same plane (one-layer structure), in which there is a small gap between neighboring subzones.

FIG. 5A illustrates a structure where all electrodes are on the same plane (one-layer structure), in which there is a small gap between neighboring subzones. The controller or Driver 510 is connected by Wires 520 to vias or Contacts 530, which in turn are connected to individually controllable Electrodes 540. Note that the wires 520 may be electrically insulated from the electrodes 540 by an insulating layer (not shown), and then the wires may be selectively contacted to the electrodes through vias (holes or pathways in said insulating layer) or contacts 530. This type of contact fabrication is well known in manufacturing lithography, and in integrated circuit manufacture.

More specifically, FIG. 5A illustrates a layout of concentric, individually addressable (individually controllable) ring shaped electrodes in one layer. Neglecting the wires 520 and the vias through the insulation, this layout is defined as a "one-layer" structure because all of the electrodes are in a single layer.

Alternately, the wires 520 may be ganged close together in a bus (not shown) running radially with respect to concentric ring electrodes.

Note that other patterned electrode shapes may be used. For example, a hexagonal array may contain hexagonal pixels, or a grid array may contain square pixels, or a set of irregular shapes may correct for non-symmetric refractive errors. Irregular or complex shaped electrodes may be fabricated to correct for a specific non-symmetric or non-conventional or high order refractive error. Additionally, the electrodes may have variable thickness in the direction of the optical axis, in order to create more complex interactions with the liquid crystals.

Alternately, arrays with high pixel densities may be controlled to approximate the concentric rings of FIG. 5A to create diffractive lenses, particularly if more than two pixels fit inside the width of one ring electrode. Such high pixel density arrays may also approximate more complex shapes.

Returning to FIG. 5A, let us define the innermost ring electrode as electrode number 1, and count outwards to the 16$^{th}$ and outermost electrode. Note that the innermost electrode may preferably be a full circle instead of a ring, but FIG. 5A illustrates a ring for symmetry, and to more clearly illustrate the via or contact 530 with the innermost ring electrode.

To create a 4 level or 4 phase diffractive lens, the innermost four rings are grouped into one zone. This first zone comprises electrodes 1-4, numbering from the innermost electrode outward. Each of these electrodes 1-4 is a subzone of the first zone. The second zone is comprised by electrodes 5-8. The third zone is comprised by electrodes 9-12. The fourth zone is comprised by electrodes 13-16. This organization of a 16 electrodes yields a 4 level (or phase) diffractive lens with 4 zones.

Each ring electrode 540 is independently addressable by wires 520 as discussed above. If all the electrodes are distributed in one layer, there must be electrically insulating gaps between neighboring electrodes. The gaps between the electrodes may cause phase distortion, and simulation of this design shows that this phase distortion may greatly affect the diffraction efficiency and other performance measures.

To alleviate the distortion caused by insulating gaps between electrodes in a one layer design, other electrode configurations may be used. For example, the ring electrodes may be separated into two distinct layers, to create a "two-layer" design.

Specifically, the odd numbered rings may be placed in one electrode layer, and the even numbered rings may be placed in a separate second electrode layer. These two distinct electrode layers may be separated by an insulating layer such as SiO$_2$.

Figure 5B:
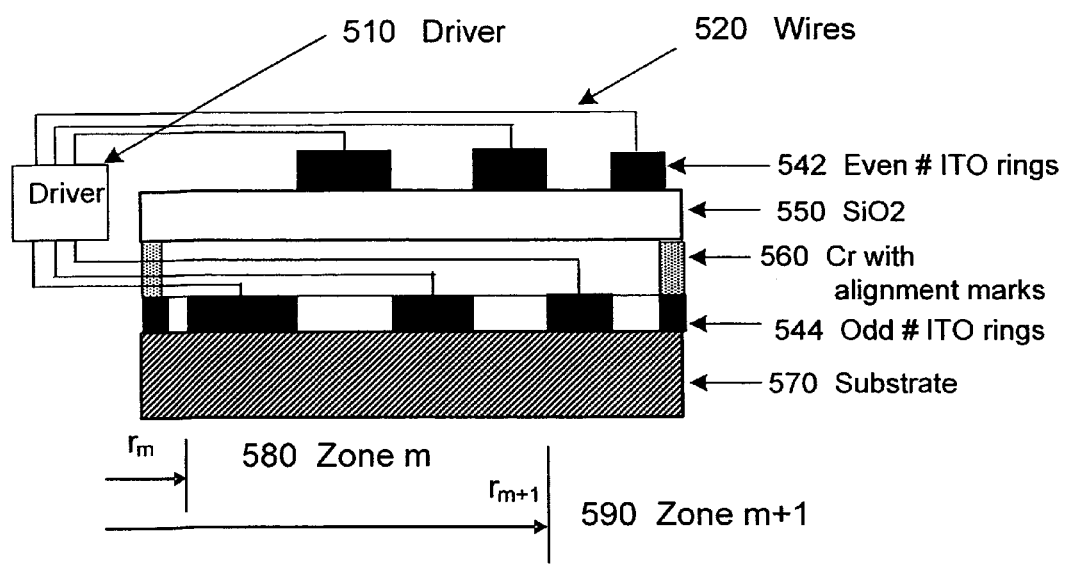
FIG. 5B illustrates a structure where odd-numbered electrodes and even-numbered electrodes are interleaved into two horizontal layers, and there is no gap between neighboring subzones (two-layer structure).

FIG. 5B illustrates a structure where odd-numbered electrodes and even-numbered electrodes are interleaved into two horizontal layers and there is no gap between neighboring subzones (two-layer structure).

The controller or Driver 510 communicates through wires 520 to the electrodes, and the electrodes are grouped into a layer with the even rings 542 and a layer with the odd rings 544. These two electrode layers are separated by an insulating layer $SiO_2$ 544. Cr alignment marks 560 are also shown for photolithographic fabrication alignment. Zone m 580 and Zone m+1 590 are also shown, corresponding to adjacent zones from FIG. 5A.

In FIG. 5B, the cross section of the two-layer electrode pattern is displayed, wherein odd- and even-numbered rings are distributed in two separate layers and there are no gaps between two neighboring electrodes when viewed in a perpendicular direction (viewed along the optical axis). Specifically, note that Zone m 580 extends from $r_m$ to $r_{m+1}$ and comprises a total of 4 electrodes. 2 of the 4 electrodes in Zone m 580 are even numbered and reside in layer 542, and the remaining 2 electrodes in Zone m 580 reside in layer 544.

In this case, each ring electrode 540 may be individually addressed from an additional layer (not shown in FIG. 5B) through vias as in the one-layer case. The wires 520 may be located in any convenient location or layer.

One example of formation of a two-layer structure follows. For substrates onto which patterned electrodes will be applied, alignment marks 560 are deposited on the conducting layer. Any suitable material may be used for the alignment marks, such as Cr. The alignment marks 560 allow proper alignment of the various photolithographic masks to the substrate and therefore of the patterns which are created in the processing steps associated with use of each mask from the "mask set" that was made in order to have the desired total photolithographic definition of the electrodes when the electrodes are patterned. One part of a zone of patterned electrodes is formed in the conducting layer using methods known in the art and described herein. A layer of insulator, such as $SiO_2$ 550 is deposited onto the patterned conductor layer. A second layer of conductor is deposited onto the $SiO_2$ and the second part of the patterned electrodes zone is formed in the second layer of conductor.

An alignment layer (not shown) is placed on the second layer of conductor and over the second substrate's conductor. The alignment layer is prepared by means known in the art such as unidirectional rubbing. Currently used alignment layers are spin coated polyvinyl alcohol or nylon 6,6. It is preferred that the alignment layer on one substrate is rubbed antiparallel from the alignment layer on the other substrate. This allows proper alignment of the liquid crystal, as known in the art. A layer of liquid crystal is placed between the substrates, and the substrates are kept at a desired distance apart (such as between 3 and 20 microns apart) with glass spacers, or other means known in the art. Spacers may be any desired material such as Mylar, glass or quartz, or other materials useful to provide the desired spacing. In order to achieve efficient diffraction the liquid crystal layer must be thick enough to provide one wave of activated retardation ($d > \lambda/\delta n \sim 2.5$ μm, where $\delta n$ is the birefringence of the liquid crystal media), but thicker liquid crystal layers help to avoid saturation phenomena. Disadvantages of thicker cells include long switching times (varying as $d^2$) and loss of electroactive feature definition. The transparent substrates can be spaced any distance apart that allows for the desired number of patterned electrodes and the desired thickness of liquid crystal layer. In particular embodiments, the transparent substrates are spaced between three and 20 microns apart, and all individual values and ranges therein. One currently preferred spacing is 5 microns.

In operation, the voltage required to change the index of refraction to a desired level is applied to the electrodes by a controller. A "controller" can include or be included in a processor, a microprocessor, an integrated circuit, an IC, a computer chip, and/or a chip. Typically, voltages up to about 2 Vrms are applied to the electrodes. Phase-synchronized, wave-form controlling drivers are connected to each electrode group in common-ground configuration. Driver amplitudes are simultaneously optimized for maximum focusing diffraction efficiency. The voltage function required to change the index of refraction to a desired level is determined by the liquid crystal or liquid crystal mixture used, as known in the art.

Figure 6:
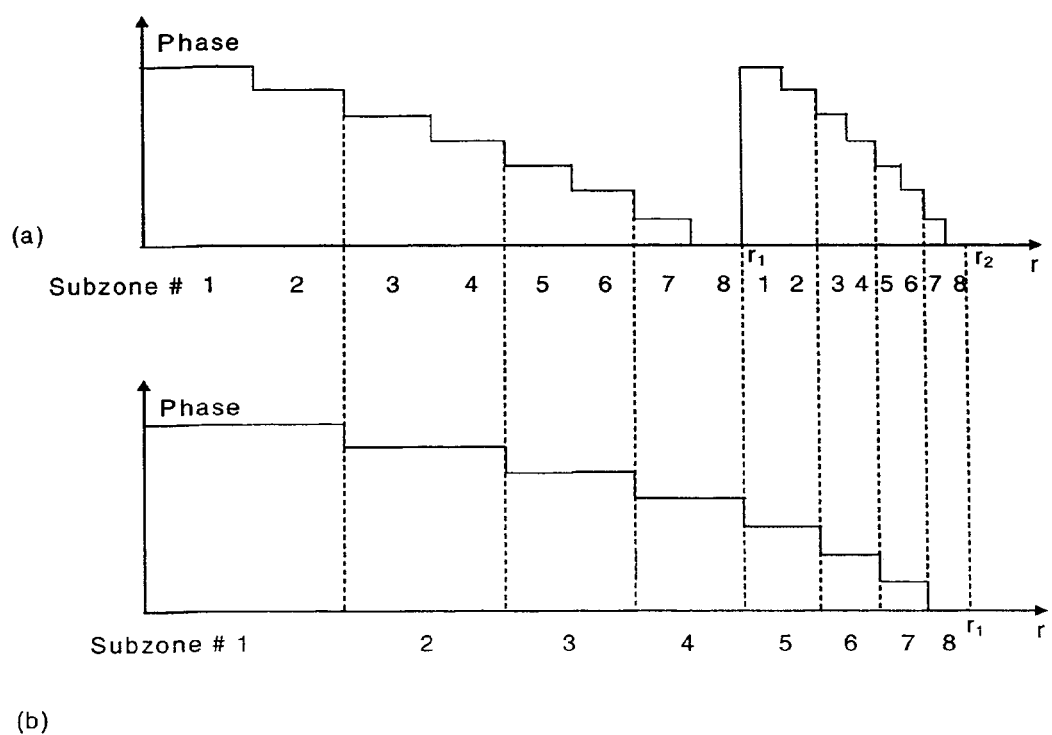
FIG. 6 shows an example of digital variable focal length using the individually addressable electrode pattern.

FIG. 6 shows an example of digital variable focal length using the individually addressable electrode pattern. Graph (a) corresponds to the basic focal length F, which is determined by the area of the original single electrode (i.e., the period of the original structure). The period of the structure is the area of the original single electrode. The focal length can be increased to multiples of F by increasing the period of the lens without affecting the diffraction efficiency. Graph (b) corresponds to the focal length 2F. The area of each zone (subzone) of FIG. 6B is twice that of FIG. 6A. The diffraction efficiency is the same for both cases.

In one specific example, the voltages applied to the four electrodes of a particular 4-phase level lens are 1.1V, 1.31V, 1.49V, and 1.72V, respectively. In another example, the voltages applied to the eight electrodes of a particular 8-phase level lens are 0.71V, 0.97V, 1.05V, 1.13V, 1.21V, 1.30V, 1.37V, and 1.48V, respectively. The voltages applied to the electrodes are easily determinable by one of ordinary skill in the art without undue experimentation and are a function of the liquid crystal used, arrangement of the cell, and other factors, as known in the art. As described above, the voltages can be positive or negative, depending on the desired focal length, as known in the art. In one embodiment the voltages applied to the electrodes are positive or negative values between 0.5 and 2 V, and all individual values and subranges therein.

The insulating material may be any suitable material, including those specifically described herein, and other materials known in the art. In one embodiment, the conductive material and insulating material are arranged in alternating patterns, for example circles with increasing radius. The patterns may be any desired pattern, such as circular, semicircular, square, angular, or any other shape that provides the desired effect, as described herein. The terms "circular, semicircular, square, angular" and other shapes are not intended to mean a perfect shape is formed, rather, the shape is generally formed, and may include, as known in the art, bus lines or other methods of bringing current through the substrate.

Any liquid crystal can be used in the invention. It is preferred that the switching time is fast enough so that the user is not aware of a delay in switching from one focal length to another. In particular embodiments described herein, a nematic liquid crystal is used as the electro-optic medium. In this embodiment, the lens has an optical response to one of the two orthogonal polarization components of light. Polarization-insensitive cholesteric liquid crystal can also be used, in which case a polarizer is unnecessary. The liquid crystal used in the invention include those that form nematic, smectic, or cholesteric phases that possess a long-range orientational order that can be controlled with an electric field. It is preferred that the liquid crystal have a wide nematic temperature range, easy alignability, low threshold voltage, large electroactive response and fast switching speeds, as well as proven stability and reliable commercial availability. In one preferred embodiment, E7 (a nematic liquid crystal mixture of cyanobiphenyls and cyanoterphenyls sold by Merck) is used. Examples of other nematic liquid crystals that can be used in the invention are: pentyl-cyanobiphenyl (5CB), (n-octyloxy)-4-cyanobiphenyl (8OCB). Other examples of liquid crystals that can be used in the invention are the n=3, 4, 5, 6, 7, 8, 9, of the compounds 4-cyano-4-n-alkylbiphenyls, 4-n-pentyloxy-biphenyl, 4-cyano-4"-n-alkyl-p-terphenyls, and commercial mixtures such as E36, E46, and the ZLI-series made by BDH (British Drug House)-Merck.

Electroactive polymers can also be used in the invention. Electroactive polymers include any transparent optical polymeric material such as those disclosed in "Physical Properties of Polymers Handbook" by J. E. Mark, American Institute of Physics, Woodburry, N.Y., 1996, containing molecules having unsymmetrical polarized conjugated n electrons between a donor and an acceptor group (referred to as a chromophore) such as those disclosed in "Organic Nonlinear Optical Materials" by Ch. Bosshard et al., Gordon and Breach Publishers, Amsterdam, 1995. Examples of polymers are as follows: polystyrene, polycarbonate, polymethylmethacrylate, polyvinylcarbazole, polyimide, polysilane. Examples of chromophores are: paranitroaniline (PNA), disperse red 1 (DR 1), 3-methyl-4-methoxy-4'-nitrostilbene, diethylaminonitrostilbene (DANS), diethyl-thio-barbituric acid. Electroactive polymers can be produced by: a) following a guest/host approach, b) by covalent incorporation of the chromophore into the polymer (pendant and main-chain), and/or c) by lattice hardening approaches such as cross-linking, as known in the art.

Polymer liquid crystals (PLCs) may also be used in the invention. Polymer liquid crystals are also sometimes referred to as liquid crystalline polymers, low molecular mass liquid crystals, self-reinforcing polymers, in situ-composites, and/or molecular composites. PLCs are copolymers that contain simultaneously relatively rigid and flexible sequences such as those disclosed in "Liquid Crystalline Polymers: From Structures to Applications" by W. Brostow; edited by A. A. Collyer, Elsevier, N.Y.-London, 1992, Chapter 1. Examples of PLCs are: polymethacrylate comprising 4-cyanophenyl benzoate side group and other similar compounds.

Polymer dispersed liquid crystals (PDLCs) may also be used in the invention. PDLCs consist of dispersions of liquid crystal droplets in a polymer matrix. These materials can be made in several ways: (i) by nematic curvilinear aligned phases (NCAP), by thermally induced phase separation (TIPS), solvent-induced phase separation (SIPS), and polymerization-induced phase separation (PIPS), as known in the art. Examples of PDLCs are: mixtures of liquid crystal E7 (BDH-Merck) and NOA65 (Norland products, Inc. NJ); mixtures of E44 (BDH-Merck) and polymethylmethacrylate (PMMA); mixtures of E49 (BDH-Merck) and PMMA; mixture of the monomer dipentaerythrol hydroxy penta acrylate, liquid crystal E7, N-vinylpyrrolidone, N-phenylglycine, and the dye Rose Bengal.

Polymer-stabilized liquid crystals (PSLCs) can also be used in the invention. PSLCs are materials that consist of a liquid crystal in a polymer network in which the polymer constitutes less than 10% by weight of the liquid crystal. A photopolymerizable monomer is mixed together with a liquid crystal and an UV polymerization initiator. After the liquid crystal is aligned, the polymerization of the monomer is initiated typically by UV exposure and the resulting polymer creates a network that stabilizes the liquid crystal. For examples of PSLCs, see, for instance: C. M. Hudson et al. Optical Studies of Anisotropic Networks in Polymer-Stabilized Liquid Crystals, Journal of the Society for Information Display, vol. 5/3, 1-5, (1997), G. P. Wiederrecht et al, Photorefractivity in Polymer-Stabilized Nematic Liquid Crystals, J. of Am. Chem. Soc., 120, 3231-3236 (1998).

Self-assembled nonlinear supramolecular structures may also be used in the invention. Self-assembled nonlinear supramolecular structures include electroactive asymmetric organic films, which can be fabricated using the following approaches: Langmuir-Blodgett films, alternating polyelectrolyte deposition (polyanion/polycation) from aqueous solutions, molecular beam epitaxy methods, sequential synthesis by covalent coupling reactions (for example: organotrichlorosilane-based self-assembled multilayer deposition). These techniques usually lead to thin films having a thickness of less than about 1 μm.

Although the nonlimiting description herein provides further details of specific exemplary embodiments, different lens and electrode configurations are useful for various applications. For example, a lens can be immersed in a solution of liquid crystal or liquid crystal can be sandwiched between planar electrode plates with a gradient refractive index change. The latter makes the liquid crystal alignment easier and the cell thinner which permits faster switching. In addition, different electrode zone configurations can be used in the methods and devices of this invention. These different lens and electrode zone configurations and other configurations as known in the art are intended to be included in this disclosure.

New design with Individually Addressable Patterned Electrodes

In order to overcome the limitations of previous designs, each electrode subzone of the patterned electrode must be individually addressed. Here two different exemplary applications are presented. One allows switching between the elementary focal length and multiples of the elementary focal length. The other is more general and allows continuous adjustment of the focal length from the minimum possible value to infinity.

1: Discrete Adjustment of Focal Length

Consider the general structure of liquid crystal lens shown in FIG. 3 and the electrode pattern shown in FIG. 5A or FIG. 5B. The phase profile across the lens is adjusted by applying proper voltages to the patterned electrodes and the phase profile determines the diffraction efficiency.

Individually addressing the subzones of the patterned electrodes allows increase of the zone period and thus increase of the focal length without sacrificing the diffraction efficiency. Assume the geometry of the electrode pattern is designed for focal length F with L-phase level phase modulation. Based on Eqs. (2a), (2b) and (3), if the zone period $r_1^2$ is increased to 2 $r_1^2$ by grouping every two neighboring subzones into one, i.e., applying the same voltage to the two neighboring electrodes, then the focal length is changed to 2F without change of diffraction efficiency (FIG. 6). Similarly, with the fixed electrode pattern, the focal length can be varied to 3F, 4F, . . . , by increasing the zone period to $3r_1^2$, $4r_1^2$, . . . , respectively. Generally, the focal length can be varied to kF (k is a positive integer) by increasing the zone period to $kr_1^2$.

If the individually addressable electrode pattern is designed for an adaptive lens with an elementary focusing power of, for example, 3 diopter (focal length F=33.33 cm) and 8-level phase steps, the lens has a diffraction efficiency of 95%. By increasing the period twice, the focal length will be increased to 2F=66.67 cm (focusing power=1.5 diopter) while the efficiency is still 95%. By increasing the period three times, the focal lengths will be increased to 3F=100 cm, corresponding to a focusing power of 1 diopter, while the efficiency is still the same. By increasing the period four times, the focal length will be increased to 4F=133.32 cm, corresponding to a focusing power of 0.75 diopter, while the efficiency is still the same. Analogously, larger focal lengths (smaller focusing powers) can be achieved with the same efficiency. When the lens is turned off, there is no focusing power. Table 2 shows parameters for various focusing powers. The radius for each subzone of 3-diopter, 1.5-diopter, and 1-diopter lenses are shown in Tables 3-5 respectively. These construction parameters can be calculated from the equations presented herein. Relations between the subzone boundaries for the three focusing powers can be easily seen.

Table 2 gives examples of some of the focusing powers that can be achieved using individually addressable patterned electrodes. Assume the elementary focusing power is 3 diopter (F=33.3 cm) and the aperture of the lens is 10 mm. Table 2 shows the diffraction efficiency stays the same as the focal length is varied.

TABLE 2

| Focusing power | Phase levels | Diffraction efficiency | k value F' = kF | Area of each subzone | Width of the last subzone |
|---|---|---|---|---|---|
| 3 diopter (F = 33.33 cm) | 8 | 95% | 1 | $1.453 \times 10^5$ μm$^2$ | 4.6 μm |
| 1.5 diopter (F = 66.67 cm) | 8 | 95% | 2 | $2.906 \times 10^5$ μm$^2$ | 9.2 μm |
| 1 diopter (F = 100 cm) | 8 | 95% | 3 | $4.359 \times 10^5$ μm$^2$ | 13.8 μm |
| 0.75 diopter (F = 133.32 cm) | 8 | 95% | 4 | $5.812 \times 10^5$ μm$^2$ | 18.5 μm |
| 0 diopter (Lens OFF) | Not Applicable | — | Infinity | — | — |

The significant advantage of the individually addressable patterned electrode is that it truly provides the same lens with the adaptive capability for different focusing powers with the same diffraction efficiency.

In this application, adjustable focal lengths are the elementary focal length F and multiples of the elementary focal length. Thus the resolution of the adjustment is also F. For example, if the electrodes are designed for an elementary focal length of 10 cm, then the adjustable focal length would be 10 cm, 20 cm, 30 cm, and so on, to infinity. If other intermediate focal lengths are desired, a smaller elementary focal length can be used. However, when F is small, the feature size of the electrodes becomes very small for a large-aperture lens and it is difficult to make them with low cost with currently available techniques.

2: Continuous Adjustment of Focal Length

It is desirable to design the adaptive lens so that it can be used by all patients and applications. This requires the lens to have the capability to continuously change the focal length in a desired range. For this purpose, a more general design methodology was developed that allows continuous adjustment of the focal length. As described above, the patterned electrodes are a circular array of rings of particular size. Each ring is individually addressable. A proper resolution of the ring is determined by the focal length range to be adjusted. For each desired focal length, the size of each subzone of all the zones can be calculated using Eqs. (2a) and (2b). A certain number of rings can be chosen to form each subzone and appropriate voltage can be applied. If the resolution of the rings is good enough, the lens can always have high efficiency with no significant change in efficiency as the focal length changes. The resolution necessary for the patterned electrodes is determined by the size of the subzones in the last few zones for the desired lenses, as described herein.

Figure 7:
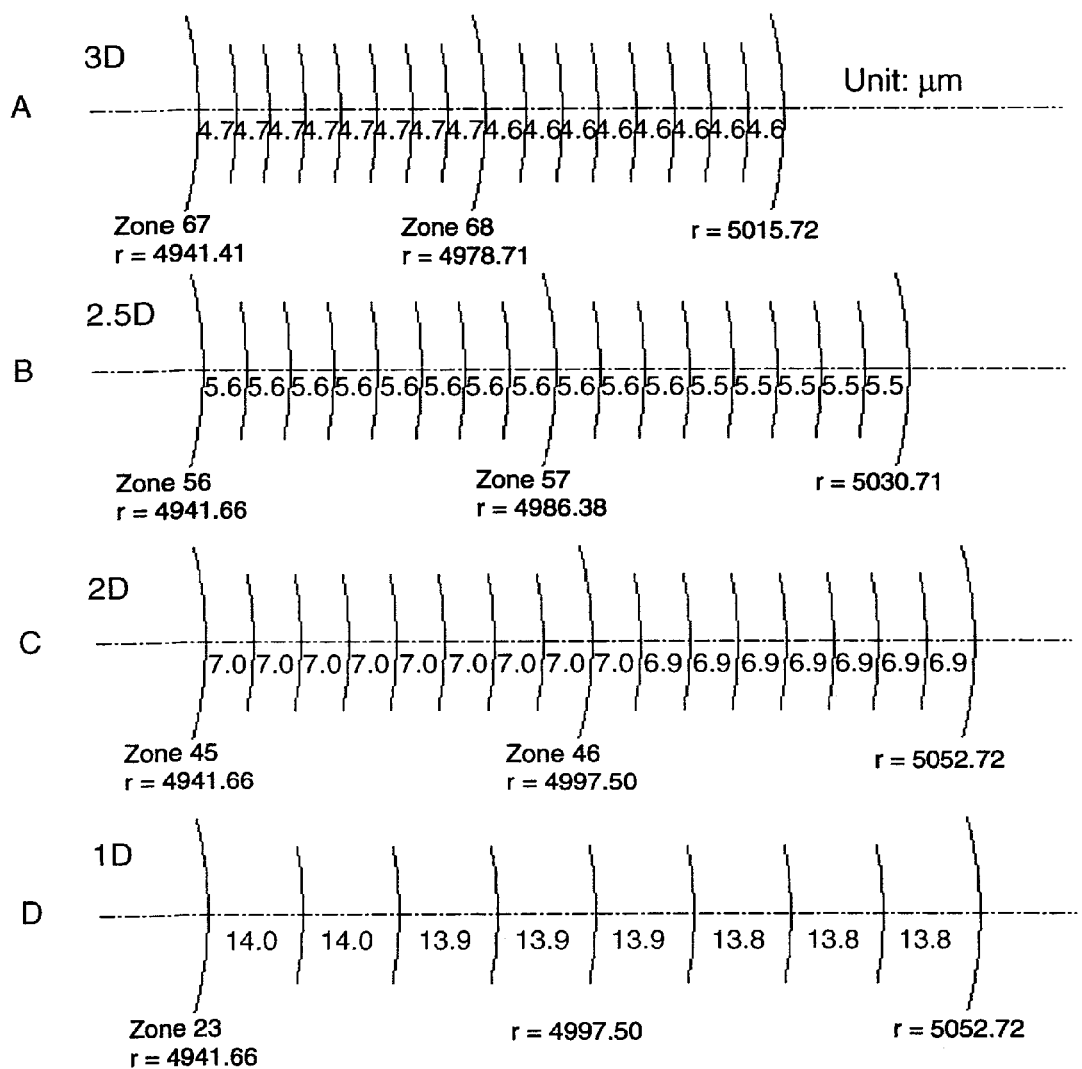
FIGS. 7A-7D show continuous adjustment of the focal length using individually addressable circular array of electrodes with proper resolution.

FIG. 7 shows continuous adjustment of the focal length using individually addressable circular array of electrodes with proper resolution. The four examples in FIG. 7 show the electrode spacing in μm for a subset of electrodes. Geometric parameters for 3 D, 2.5 D, 2 D, and 1 D focusing powers are depicted in examples A, B, C and D, respectively. r is the radius of the zone boundary.

An example of continuously changing the focal length from ~30 cm to infinity is illustrated here. Assume the diameter of the lens is 10 mm and 8-level phase modulation is used. To illustrate the principle, the geometric parameters for the adjustable focusing powers of 3 D, 2.5 D, 2 D, and 1 D are depicted in FIG. 7, where the radius of each zone boundary and the width of each subzone for the last one or two zone are clearly shown. More detailed parameters for these lenses can be found in Tables 3-7. It is seen that for a particular focusing power, the variation of the width of each subzone is very small at the edges of these lenses, and the variation is even smaller as the aperture of the lens increases. For higher focusing power, the width as well as the area of each subzone is smaller. Assume each electrode is 1 μm wide in this area. In this example, since the width of each subzone is larger than 1 μm, several electrodes can be combined together to form one subzone and the boundary of each subzone can be rounded to the closest electrode boundary. Combining the electrodes means applying the same voltages to them.

For example, for the 2 D case (example C), 7 electrodes can be combined to form all the subzones of zone 45. All the other subzones can be generated similarly. The rounding error causes very small variation in diffraction efficiency. On the other hand, in the area close to the center of the lens, if similar fine electrodes are used, then the phase steps can be higher than 8 and hence the diffraction efficiency can be increased in that area. In general, the diffraction efficiency would be almost the same when focusing power is adjusted. As the focal length increases from 1 m (focusing power 1 D) to infinity, the width of each subzone increases, and all the subzones can be generated by combining a calculated number of electrodes. Therefore in this example, all the focal lengths from ~30 cm to infinity (focusing power from 0 to 3 D) can be adjusted, and the lens can be used for all the subjects who need correction in this range for different distance vision.

As pointed out above, since the zones close to the center have larger geometric size, the density of the electrodes can be smaller in that area (the size of the electrodes close to the center can be larger than those in the other area) in comparison with the area close to the edges. If the same density of electrodes is kept in the area close to the center, higher phase levels can be obtained and the diffraction efficiency will be increased.

Another approach to achieve this goal is to use a pixilated spatial light modulator where small rectangular pixels are used. These pixels may be in multiple layers to reduce or eliminate gaps when viewed perpendicularly to the substrate, similar to the 2 layers of circular electrodes illustrated in FIG. 5B.

Although the description herein contains many specificities, these should not be construed as limiting the scope of the invention, but merely providing examples of some of the presently preferred embodiments of the invention. Additional embodiments are within the scope of the invention. The invention is not limited in use to spectacles. The invention may also be used in microscopes, mirrors, binoculars, and any other optical device through which a user may look. In addition, as will be apparent to one of ordinary skill in the art, the invention is useful in other fields such as telecommunications, optical switches and medical devices. Any liquid crystal or mixture of liquid crystals that provides the desired phase transmission function at the desired wavelength is useful in the invention, as known by one of ordinary skill in the art. Determining the proper voltage and applying the proper voltage to liquid crystal materials to produce a desired phase transmission function is known in the art.

Every device or combination of components described or exemplified can be used to practice the invention, unless otherwise stated. Additional components such as drivers to apply the voltages used, controllers for the voltages and any additional optical components are known to one of ordinary skill in the art and incorporated without undue experimentation. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials, and fabrication methods other than those specifically exemplified can be employed in the practice of the invention without resort to undue experimentation. All art-known functional equivalents, of any such methods, device elements, starting materials, and fabrication methods are intended to be included in this invention. Whenever a range is given in the specification, for example, a thickness range or a voltage range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed and described. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

In general the terms and phrases used herein have their art-recognized meaning, which can be found by reference to standard texts, journal references and contexts known to those skilled in the art. Specific definitions are provided to clarify their specific use in the context of the invention. All patents and publications mentioned in the specification are indicative of the levels of skill of those skilled in the art to which the invention pertains.

One skilled in the art would readily appreciate that the present invention is well adapted to carry out the objects and obtain the ends and advantages mentioned, as well as those inherent therein. The devices and methods and accessory methods described herein as presently representative of preferred embodiments are exemplary and are not intended as limitations on the scope of the invention. Changes therein and other uses will occur to those skilled in the art, which are encompassed within the spirit of the invention, are defined by the scope of the claims.

All references cited herein are hereby incorporated by reference to the extent that there is no inconsistency with the disclosure of this specification. Some references provided herein are incorporated by reference herein to provide details concerning additional device components, additional liquid crystal cell configurations, additional patterns for patterned electrodes, additional methods of analysis and additional uses of the invention.

G. Smith et al., The eye and visual optical instruments, Cambridge University Press, 1997.

G. Vdovin et al., On the possibility of intraocular adaptive optics, Opt. Express 11:810-817, 2003.

G. Williams et al., Electrically controllable liquid crystal Fresnel lens, Proc. SPIE 1168:352-357, 1989.

J. S. Patel et al., Electrically controlled polarization-independent liquid-crystal Fresnel lens arrays, Opt. Left. 16:532-534, 1991.

B. Dance, Liquid crystal used in switchable Fresnel lens, Laser Focus World 28:34, 1992.

M. C. K. Wiltshire, Non-display applications of liquid crystal devices, Geo J. Research 10:119-125, 1993.

H. Ren et al., Tunable Fresnel lens using nanoscale polymer-dispersed liquid crystals, Appl. Phys. Lett. 83:1515-1517, 2003.

C. W. Fowler et al., Liquid crystal lens review, Ophthal. Physiol. Opt. 10:186-194, 1990.

J. A. Futhey, Diffractive bifocal intraocular lens, Proc. SPIE 1052:142-149, 1989.

S. Sato et al., Variable-focus liquid crystal Fresnel lens, Jpn. J. Appl. Phys. 24:L626-L628, 1985.

L. G. Commander et al., Variable focal length microlenses, Opt. Commun. 177:157-170, 2000.

S. T. Kowel et al., Focusing by electrical modulation of refraction in a liquid crystal cell, Appl. Opt. 23:278-289, 1984.

Nouhi et al., Adaptive spherical lens, Appl. Opt. 23:2774-2777, 1984.

F. Naumov et al., Liquid-crystal adaptive lenses with modal control, Opt. Lett. 23:992-994, 1998.

M. Y. Loktev et al., Wave front control systems based on modal liquid crystal lenses, Rev. Sci. Instrum. 71:3190-3297, 2000.

N. A. Riza et al., Three-terminal adaptive nematic liquid-crystal lens device, Opt. Lett. 19:1013-1015, 1994.

P. W. McOwan et al., A switchable liquid crystal binary Gabor lens, Opt. Commun. 103:189-193, 1993.

S. Masuda et al., Liquid-crystal microlens with a beam-steering function, Appl. Opt. 36:4772-4778, 1997.

Kress et al., Digital Diffractive Optics, John Wiley & Sons Ltd., 2000.

TABLE 3

The outer radius of each subzone for a 3D, 15-mm, 8-level diffractive lens.

| Zone # | Subzone # | | | | | | | |
|---|---|---|---|---|---|---|---|---|
| | 1 | 2 | 3 | 4 | 5 | 6 | 7 | 8 |
| 1. | 215.05 | 304.12 | 372.47 | 430.09 | 480.86 | 526.76 | 568.96 | 608.25 |
| 2. | 645.14 | 680.04 | 713.23 | 744.95 | 775.36 | 804.63 | 832.87 | 860.19 |
| 3. | 886.66 | 912.37 | 937.37 | 961.72 | 985.47 | 1008.66 | 1031.33 | 1053.51 |
| 4. | 1075.24 | 1096.53 | 1117.42 | 1137.92 | 1158.07 | 1177.86 | 1197.33 | 1216.49 |
| 5. | 1235.35 | 1253.93 | 1272.24 | 1290.28 | 1308.08 | 1325.64 | 1342.97 | 1360.08 |
| 6. | 1376.98 | 1393.67 | 1410.16 | 1426.46 | 1442.58 | 1458.52 | 1474.29 | 1489.89 |
| 7. | 1505.33 | 1520.61 | 1535.75 | 1550.73 | 1565.57 | 1580.27 | 1594.83 | 1609.27 |
| 8. | 1623.57 | 1637.75 | 1651.81 | 1665.75 | 1679.57 | 1693.28 | 1706.89 | 1720.38 |
| 9. | 1733.77 | 1747.05 | 1760.24 | 1773.33 | 1786.32 | 1799.22 | 1812.02 | 1824.74 |
| 10. | 1837.37 | 1849.91 | 1862.36 | 1874.74 | 1887.03 | 1899.25 | 1911.38 | 1923.44 |
| 11. | 1935.43 | 1947.34 | 1959.17 | 1970.94 | 1982.64 | 1994.27 | 2005.83 | 2017.32 |
| 12. | 2028.75 | 2040.12 | 2051.42 | 2062.66 | 2073.84 | 2084.96 | 2096.02 | 2107.03 |
| 13. | 2117.97 | 2128.86 | 2139.69 | 2150.47 | 2161.20 | 2171.87 | 2182.49 | 2193.06 |
| 14. | 2203.58 | 2214.05 | 2224.47 | 2234.84 | 2245.16 | 2255.44 | 2265.66 | 2275.85 |
| 15. | 2285.98 | 2296.08 | 2306.13 | 2316.13 | 2326.09 | 2336.01 | 2345.89 | 2355.73 |
| 16. | 2365.52 | 2375.28 | 2384.99 | 2394.67 | 2404.30 | 2413.90 | 2423.46 | 2432.98 |
| 17. | 2442.47 | 2451.92 | 2461.33 | 2470.71 | 2480.05 | 2489.35 | 2498.62 | 2507.86 |
| 18. | 2517.07 | 2526.23 | 2535.37 | 2544.47 | 2553.55 | 2562.59 | 2571.59 | 2580.57 |
| 19. | 2589.51 | 2598.43 | 2607.31 | 2616.16 | 2624.99 | 2633.78 | 2642.55 | 2651.28 |
| 20. | 2659.99 | 2668.67 | 2677.32 | 2685.94 | 2694.53 | 2703.10 | 2711.64 | 2720.16 |
| 21. | 2728.65 | 2737.11 | 2745.54 | 2753.95 | 2762.33 | 2770.69 | 2779.02 | 2787.33 |
| 22. | 2795.62 | 2803.87 | 2812.11 | 2820.32 | 2828.51 | 2836.67 | 2844.81 | 2852.93 |
| 23. | 2861.02 | 2869.09 | 2877.14 | 2885.16 | 2893.17 | 2901.15 | 2909.11 | 2917.04 |
| 24. | 2924.96 | 2932.86 | 2940.73 | 2948.58 | 2956.41 | 2964.22 | 2972.01 | 2979.78 |
| 25. | 2987.53 | 2995.26 | 3002.97 | 3010.66 | 3018.33 | 3025.98 | 3033.62 | 3041.23 |
| 26. | 3048.82 | 3056.40 | 3063.95 | 3071.49 | 3079.01 | 3086.51 | 3093.99 | 3101.46 |
| 27. | 3108.90 | 3116.33 | 3123.74 | 3131.14 | 3138.51 | 3145.87 | 3153.21 | 3160.54 |
| 28. | 3167.85 | 3175.14 | 3182.41 | 3189.67 | 3196.91 | 3204.13 | 3211.34 | 3218.53 |
| 29. | 3225.71 | 3232.87 | 3240.02 | 3247.14 | 3254.26 | 3261.35 | 3268.44 | 3275.50 |
| 30. | 3282.56 | 3289.59 | 3296.61 | 3303.62 | 3310.61 | 3317.59 | 3324.55 | 3331.50 |
| 31. | 3338.43 | 3345.35 | 3352.26 | 3359.15 | 3366.02 | 3372.89 | 3379.73 | 3386.57 |
| 32. | 3393.39 | 3400.20 | 3406.99 | 3413.77 | 3420.54 | 3427.29 | 3434.03 | 3440.76 |
| 33. | 3447.47 | 3454.17 | 3460.86 | 3467.53 | 3474.20 | 3480.85 | 3487.48 | 3494.11 |
| 34. | 3500.72 | 3507.32 | 3513.90 | 3520.48 | 3527.04 | 3533.59 | 3540.13 | 3546.65 |
| 35. | 3553.17 | 3559.67 | 3566.16 | 3572.64 | 3579.10 | 3585.56 | 3592.00 | 3598.43 |
| 36. | 3604.85 | 3611.26 | 3617.66 | 3624.04 | 3630.42 | 3636.78 | 3643.13 | 3649.48 |
| 37. | 3655.81 | 3662.12 | 3668.43 | 3674.73 | 3681.02 | 3687.29 | 3693.56 | 3699.81 |
| 38. | 3706.06 | 3712.29 | 3718.52 | 3724.73 | 3730.93 | 3737.12 | 3743.31 | 3749.48 |
| 39. | 3755.64 | 3761.79 | 3767.93 | 3774.07 | 3780.19 | 3786.30 | 3792.40 | 3798.49 |
| 40. | 3804.58 | 3810.65 | 3816.71 | 3822.77 | 3828.81 | 3834.84 | 3840.87 | 3846.88 |
| 41. | 3852.89 | 3858.89 | 3864.87 | 3870.85 | 3876.82 | 3882.78 | 3888.73 | 3894.67 |
| 42. | 3900.61 | 3906.53 | 3912.44 | 3918.35 | 3924.25 | 3930.13 | 3936.01 | 3941.88 |
| 43. | 3947.75 | 3953.60 | 3959.44 | 3965.28 | 3971.10 | 3976.92 | 3982.73 | 3988.53 |
| 44. | 3994.33 | 4000.11 | 4005.89 | 4011.66 | 4017.42 | 4023.17 | 4028.91 | 4034.65 |
| 45. | 4040.37 | 4046.09 | 4051.80 | 4057.51 | 4063.20 | 4068.89 | 4074.57 | 4080.24 |
| 46. | 4085.90 | 4091.56 | 4097.20 | 4102.84 | 4108.47 | 4114.10 | 4119.72 | 4125.32 |
| 47. | 4130.93 | 4136.52 | 4142.11 | 4147.68 | 4153.25 | 4158.82 | 4164.37 | 4169.92 |
| 48. | 4175.46 | 4181.00 | 4186.53 | 4192.05 | 4197.56 | 4203.06 | 4208.56 | 4214.05 |
| 49. | 4219.53 | 4225.01 | 4230.48 | 4235.94 | 4241.40 | 4246.85 | 4252.29 | 4257.72 |
| 50. | 4263.15 | 4268.57 | 4273.98 | 4279.39 | 4284.79 | 4290.18 | 4295.57 | 4300.95 |
| 51. | 4306.32 | 4311.69 | 4317.05 | 4322.40 | 4327.75 | 4333.08 | 4338.42 | 4343.74 |
| 52. | 4349.06 | 4354.38 | 4359.68 | 4364.99 | 4370.28 | 4375.57 | 4380.85 | 4386.12 |
| 53. | 4391.39 | 4396.65 | 4401.91 | 4407.16 | 4412.40 | 4417.64 | 4422.87 | 4428.10 |
| 54. | 4433.32 | 4438.53 | 4443.73 | 4448.93 | 4454.13 | 4459.32 | 4464.50 | 4469.68 |
| 55. | 4474.85 | 4480.01 | 4485.17 | 4490.32 | 4495.47 | 4500.61 | 4505.74 | 4510.87 |
| 56. | 4515.99 | 4521.11 | 4526.22 | 4531.33 | 4536.43 | 4541.52 | 4546.61 | 4551.70 |
| 57. | 4556.77 | 4561.84 | 4566.91 | 4571.97 | 4577.02 | 4582.07 | 4587.12 | 4592.16 |
| 58. | 4597.19 | 4602.21 | 4607.24 | 4612.25 | 4617.26 | 4622.27 | 4627.27 | 4632.26 |
| 59. | 4637.25 | 4642.23 | 4647.21 | 4652.19 | 4657.15 | 4662.12 | 4667.07 | 4672.02 |
| 60. | 4676.97 | 4681.91 | 4686.85 | 4691.78 | 4696.71 | 4701.63 | 4706.54 | 4711.45 |
| 61. | 4716.36 | 4721.26 | 4726.15 | 4731.04 | 4735.93 | 4740.81 | 4745.68 | 4750.55 |
| 62. | 4755.42 | 4760.28 | 4765.13 | 4769.98 | 4774.83 | 4779.67 | 4784.50 | 4789.33 |
| 63. | 4794.16 | 4798.98 | 4803.79 | 4808.61 | 4813.41 | 4818.21 | 4823.01 | 4827.80 |
| 64. | 4832.59 | 4837.37 | 4842.15 | 4846.92 | 4851.69 | 4856.45 | 4861.21 | 4865.97 |
| 65. | 4870.72 | 4875.46 | 4880.20 | 4884.94 | 4889.67 | 4894.40 | 4899.12 | 4903.83 |
| 66. | 4908.55 | 4913.26 | 4917.96 | 4922.66 | 4927.35 | 4932.04 | 4936.73 | 4941.41 |
| 67. | 4946.09 | 4950.76 | 4955.43 | 4960.09 | 4964.75 | 4969.41 | 4974.06 | 4978.71 |
| 68. | 4983.35 | 4987.99 | 4992.62 | 4997.25 | 5001.87 | 5006.50 | 5011.11 | 5015.72 |

TABLE 3-continued

The outer radius of each subzone for a 3D, 15-mm, 8-level diffractive lens.

| Zone # | Subzone # | | | | | | | |
|---|---|---|---|---|---|---|---|---|
| | 1 | 2 | 3 | 4 | 5 | 6 | 7 | 8 |
| 69. | 5020.33 | 5024.94 | 5029.53 | 5034.13 | 5038.72 | 5043.31 | 5047.89 | 5052.47 |
| 70. | 5057.04 | 5061.61 | 5066.18 | 5070.74 | 5075.30 | 5079.85 | 5084.40 | 5088.95 |
| 71. | 5093.49 | 5098.03 | 5102.56 | 5107.09 | 5111.62 | 5116.14 | 5120.66 | 5125.17 |
| 72. | 5129.68 | 5134.19 | 5138.69 | 5143.19 | 5147.68 | 5152.17 | 5156.65 | 5161.14 |
| 73. | 5165.62 | 5170.09 | 5174.56 | 5179.03 | 5183.49 | 5187.95 | 5192.40 | 5196.85 |
| 74. | 5201.30 | 5205.75 | 5210.19 | 5214.62 | 5219.05 | 5223.48 | 5227.91 | 5232.33 |
| 75. | 5236.75 | 5241.16 | 5245.57 | 5249.98 | 5254.38 | 5258.78 | 5263.17 | 5267.56 |
| 76. | 5271.95 | 5276.34 | 5280.72 | 5285.09 | 5289.47 | 5293.84 | 5298.20 | 5302.56 |
| 77. | 5306.92 | 5311.28 | 5315.63 | 5319.98 | 5324.32 | 5328.66 | 5333.00 | 5337.34 |
| 78. | 5341.67 | 5345.99 | 5350.32 | 5354.64 | 5358.95 | 5363.27 | 5367.58 | 5371.88 |
| 79. | 5376.18 | 5380.48 | 5384.78 | 5389.07 | 5393.36 | 5397.65 | 5401.93 | 5406.21 |
| 80. | 5410.48 | 5414.75 | 5419.02 | 5423.29 | 5427.55 | 5431.81 | 5436.06 | 5440.32 |
| 81. | 5444.56 | 5448.81 | 5453.05 | 5457.29 | 5461.53 | 5465.76 | 5469.99 | 5474.21 |
| 82. | 5478.43 | 5482.65 | 5486.87 | 5491.08 | 5495.29 | 5499.50 | 5503.70 | 5507.90 |
| 83. | 5512.10 | 5516.29 | 5520.48 | 5524.67 | 5528.85 | 5533.03 | 5537.21 | 5541.38 |
| 84. | 5545.55 | 5549.72 | 5553.89 | 5558.05 | 5562.21 | 5566.36 | 5570.52 | 5574.67 |
| 85. | 5578.81 | 5582.95 | 5587.09 | 5591.23 | 5595.37 | 5599.50 | 5603.62 | 5607.75 |
| 86. | 5611.87 | 5615.99 | 5620.11 | 5624.22 | 5628.33 | 5632.44 | 5636.54 | 5640.64 |
| 87. | 5644.74 | 5648.83 | 5652.92 | 5657.01 | 5661.10 | 5665.18 | 5669.26 | 5673.34 |
| 88. | 5677.41 | 5681.48 | 5685.55 | 5689.62 | 5693.68 | 5697.74 | 5701.80 | 5705.85 |
| 89. | 5709.90 | 5713.95 | 5718.00 | 5722.04 | 5726.08 | 5730.11 | 5734.15 | 5738.18 |
| 90. | 5742.21 | 5746.23 | 5750.26 | 5754.28 | 5758.29 | 5762.31 | 5766.32 | 5770.33 |
| 91. | 5774.33 | 5778.34 | 5782.34 | 5786.33 | 5790.33 | 5794.32 | 5798.31 | 5802.30 |
| 92. | 5806.28 | 5810.26 | 5814.24 | 5818.21 | 5822.19 | 5826.16 | 5830.12 | 5834.09 |
| 93. | 5838.05 | 5842.01 | 5845.97 | 5849.92 | 5853.87 | 5857.82 | 5861.77 | 5865.71 |
| 94. | 5869.65 | 5873.59 | 5877.52 | 5881.46 | 5885.39 | 5889.32 | 5893.24 | 5897.16 |
| 95. | 5901.08 | 5905.00 | 5908.91 | 5912.83 | 5916.73 | 5920.64 | 5924.55 | 5928.45 |
| 96. | 5932.35 | 5936.24 | 5940.14 | 5944.03 | 5947.92 | 5951.80 | 5955.69 | 5959.57 |
| 97. | 5963.45 | 5967.32 | 5971.20 | 5975.07 | 5978.94 | 5982.80 | 5986.67 | 5990.53 |
| 98. | 5994.39 | 5998.24 | 6002.10 | 6005.95 | 6009.80 | 6013.64 | 6017.49 | 6021.33 |
| 99. | 6025.17 | 6029.00 | 6032.84 | 6036.67 | 6040.50 | 6044.32 | 6048.15 | 6051.97 |
| 100. | 6055.79 | 6059.61 | 6063.42 | 6067.23 | 6071.04 | 6074.85 | 6078.66 | 6082.46 |
| 101. | 6086.26 | 6090.06 | 6093.85 | 6097.65 | 6101.44 | 6105.22 | 6109.01 | 6112.80 |
| 102. | 6116.58 | 6120.36 | 6124.13 | 6127.91 | 6131.68 | 6135.45 | 6139.22 | 6142.98 |
| 103. | 6146.74 | 6150.51 | 6154.26 | 6158.02 | 6161.77 | 6165.52 | 6169.27 | 6173.02 |
| 104. | 6176.77 | 6180.51 | 6184.25 | 6187.99 | 6191.72 | 6195.45 | 6199.19 | 6202.91 |
| 105. | 6206.64 | 6210.37 | 6214.09 | 6217.81 | 6221.53 | 6225.24 | 6228.95 | 6232.67 |
| 106. | 6236.37 | 6240.08 | 6243.78 | 6247.49 | 6251.19 | 6254.89 | 6258.58 | 6262.27 |
| 107. | 6265.97 | 6269.65 | 6273.34 | 6277.03 | 6280.71 | 6284.39 | 6288.07 | 6291.74 |
| 108. | 6295.42 | 6299.09 | 6302.76 | 6306.43 | 6310.09 | 6313.76 | 6317.42 | 6321.08 |
| 109. | 6324.73 | 6328.39 | 6332.04 | 6335.69 | 6339.34 | 6342.99 | 6346.63 | 6350.27 |
| 110. | 6353.91 | 6357.55 | 6361.19 | 6364.82 | 6368.45 | 6372.08 | 6375.71 | 6379.34 |
| 111. | 6382.96 | 6386.58 | 6390.20 | 6393.82 | 6397.43 | 6401.05 | 6404.66 | 6408.27 |
| 112. | 6411.87 | 6415.48 | 6419.08 | 6422.68 | 6426.28 | 6429.88 | 6433.48 | 6437.07 |
| 113. | 6440.66 | 6444.25 | 6447.84 | 6451.42 | 6455.00 | 6458.59 | 6462.16 | 6465.74 |
| 114. | 6469.32 | 6472.89 | 6476.46 | 6480.03 | 6483.60 | 6487.16 | 6490.73 | 6494.29 |
| 115. | 6497.85 | 6501.41 | 6504.96 | 6508.51 | 6512.07 | 6515.62 | 6519.16 | 6522.71 |
| 116. | 6526.25 | 6529.80 | 6533.34 | 6536.87 | 6540.41 | 6543.95 | 6547.48 | 6551.01 |
| 117. | 6554.54 | 6558.06 | 6561.59 | 6565.11 | 6568.63 | 6572.15 | 6575.67 | 6579.18 |
| 118. | 6582.70 | 6586.21 | 6589.72 | 6593.23 | 6596.73 | 6600.24 | 6603.74 | 6607.24 |
| 119. | 6610.74 | 6614.24 | 6617.73 | 6621.22 | 6624.72 | 6628.21 | 6631.69 | 6635.18 |
| 120. | 6638.66 | 6642.14 | 6645.63 | 6649.10 | 6652.58 | 6656.06 | 6659.53 | 6663.00 |
| 121. | 6666.47 | 6669.94 | 6673.40 | 6676.87 | 6680.33 | 6683.79 | 6687.25 | 6690.70 |
| 122. | 6694.16 | 6697.61 | 6701.06 | 6704.51 | 6707.96 | 6711.41 | 6714.85 | 6718.29 |
| 123. | 6721.74 | 6725.17 | 6728.61 | 6732.05 | 6735.48 | 6738.91 | 6742.34 | 6745.77 |
| 124. | 6749.20 | 6752.62 | 6756.05 | 6759.47 | 6762.89 | 6766.31 | 6769.72 | 6773.14 |
| 125. | 6776.55 | 6779.96 | 6783.37 | 6786.78 | 6790.19 | 6793.59 | 6796.99 | 6800.40 |
| 126. | 6803.79 | 6807.19 | 6810.59 | 6813.98 | 6817.37 | 6820.77 | 6824.16 | 6827.54 |
| 127. | 6830.93 | 6834.31 | 6837.70 | 6841.08 | 6844.46 | 6847.83 | 6851.21 | 6854.58 |
| 128. | 6857.95 | 6861.33 | 6864.69 | 6868.06 | 6871.43 | 6874.79 | 6878.16 | 6881.52 |
| 129. | 6884.88 | 6888.23 | 6891.59 | 6894.94 | 6898.30 | 6901.65 | 6905.00 | 6908.34 |
| 130. | 6911.69 | 6915.04 | 6918.38 | 6921.72 | 6925.06 | 6928.40 | 6931.73 | 6935.07 |
| 131. | 6938.40 | 6941.73 | 6945.06 | 6948.39 | 6951.72 | 6955.05 | 6958.37 | 6961.69 |
| 132. | 6965.01 | 6968.33 | 6971.65 | 6974.96 | 6978.28 | 6981.59 | 6984.90 | 6988.21 |
| 133. | 6991.52 | 6994.83 | 6998.13 | 7001.44 | 7004.74 | 7008.04 | 7011.34 | 7014.63 |
| 134. | 7017.93 | 7021.22 | 7024.52 | 7027.81 | 7031.10 | 7034.38 | 7037.67 | 7040.95 |
| 135. | 7044.24 | 7047.52 | 7050.80 | 7054.08 | 7057.36 | 7060.63 | 7063.91 | 7067.18 |
| 136. | 7070.45 | 7073.72 | 7076.99 | 7080.25 | 7083.52 | 7086.78 | 7090.04 | 7093.30 |
| 137. | 7096.56 | 7099.82 | 7103.08 | 7106.33 | 7109.58 | 7112.84 | 7116.09 | 7119.34 |
| 138. | 7122.58 | 7125.83 | 7129.07 | 7132.31 | 7135.56 | 7138.80 | 7142.03 | 7145.27 |
| 139. | 7148.51 | 7151.74 | 7154.97 | 7158.20 | 7161.43 | 7164.66 | 7167.89 | 7171.11 |
| 140. | 7174.34 | 7177.56 | 7180.78 | 7184.00 | 7187.22 | 7190.43 | 7193.65 | 7196.86 |
| 141. | 7200.07 | 7203.28 | 7206.49 | 7209.70 | 7212.91 | 7216.11 | 7219.32 | 7222.52 |
| 142. | 7225.72 | 7228.92 | 7232.12 | 7235.31 | 7238.51 | 7241.70 | 7244.89 | 7248.09 |

TABLE 3-continued

The outer radius of each subzone for a 3D, 15-mm, 8-level diffractive lens.

| Zone # | Subzone # | | | | | | | |
|---|---|---|---|---|---|---|---|---|
| | 1 | 2 | 3 | 4 | 5 | 6 | 7 | 8 |
| 143. | 7251.28 | 7254.46 | 7257.65 | 7260.84 | 7264.02 | 7267.20 | 7270.38 | 7273.56 |
| 144. | 7276.74 | 7279.92 | 7283.09 | 7286.27 | 7289.44 | 7292.61 | 7295.78 | 7298.95 |
| 145. | 7302.12 | 7305.28 | 7308.45 | 7311.61 | 7314.77 | 7317.93 | 7321.09 | 7324.25 |
| 146. | 7327.41 | 7330.56 | 7333.71 | 7336.87 | 7340.02 | 7343.17 | 7346.32 | 7349.46 |
| 147. | 7352.61 | 7355.75 | 7358.89 | 7362.04 | 7365.18 | 7368.32 | 7371.45 | 7374.59 |
| 148. | 7377.72 | 7380.86 | 7383.99 | 7387.12 | 7390.25 | 7393.38 | 7396.50 | 7399.63 |
| 149. | 7402.75 | 7405.88 | 7409.00 | 7412.12 | 7415.24 | 7418.36 | 7421.47 | 7424.59 |
| 150. | 7427.70 | 7430.81 | 7433.92 | 7437.03 | 7440.14 | 7443.25 | 7446.36 | 7449.46 |
| 151. | 7452.56 | 7455.67 | 7458.77 | 7461.87 | 7464.96 | 7468.06 | 7471.16 | 7474.25 |
| 152. | 7477.34 | 7480.43 | 7483.53 | 7486.61 | 7489.70 | 7492.79 | 7495.87 | 7498.96 |

TABLE 4

The outer radius of each subzone for a 1.5D, 15-mm, 8-level diffractive lens.
The area of each zone is twice that of the corresponding 3D lens (Table 3).

| Zone # | Subzone # | | | | | | | |
|---|---|---|---|---|---|---|---|---|
| | 1 | 2 | 3 | 4 | 5 | 6 | 7 | 8 |
| 1. | 304.12 | 430.09 | 526.76 | 608.25 | 680.04 | 744.95 | 804.63 | 860.19 |
| 2. | 912.37 | 961.72 | 1008.66 | 1053.51 | 1096.53 | 1137.92 | 1177.86 | 1216.49 |
| 3. | 1253.93 | 1290.28 | 1325.64 | 1360.08 | 1393.67 | 1426.46 | 1458.52 | 1489.89 |
| 4. | 1520.61 | 1550.73 | 1580.27 | 1609.27 | 1637.75 | 1665.75 | 1693.28 | 1720.38 |
| 5. | 1747.05 | 1773.33 | 1799.22 | 1824.74 | 1849.91 | 1874.74 | 1899.25 | 1923.44 |
| 6. | 1947.34 | 1970.94 | 1994.27 | 2017.32 | 2040.12 | 2062.66 | 2084.96 | 2107.03 |
| 7. | 2128.86 | 2150.47 | 2171.87 | 2193.06 | 2214.05 | 2234.84 | 2255.44 | 2275.85 |
| 8. | 2296.08 | 2316.13 | 2336.01 | 2355.73 | 2375.28 | 2394.67 | 2413.90 | 2432.98 |
| 9. | 2451.92 | 2470.71 | 2489.35 | 2507.86 | 2526.23 | 2544.47 | 2562.59 | 2580.57 |
| 10. | 2598.43 | 2616.16 | 2633.78 | 2651.28 | 2668.67 | 2685.94 | 2703.10 | 2720.16 |
| 11. | 2737.11 | 2753.95 | 2770.69 | 2787.33 | 2803.87 | 2820.32 | 2836.67 | 2852.93 |
| 12. | 2869.09 | 2885.16 | 2901.15 | 2917.04 | 2932.86 | 2948.58 | 2964.22 | 2979.78 |
| 13. | 2995.26 | 3010.66 | 3025.98 | 3041.23 | 3056.40 | 3071.49 | 3086.51 | 3101.46 |
| 14. | 3116.33 | 3131.14 | 3145.87 | 3160.54 | 3175.14 | 3189.67 | 3204.13 | 3218.53 |
| 15. | 3232.87 | 3247.14 | 3261.35 | 3275.50 | 3289.59 | 3303.62 | 3317.59 | 3331.50 |
| 16. | 3345.35 | 3359.15 | 3372.89 | 3386.57 | 3400.20 | 3413.77 | 3427.29 | 3440.76 |
| 17. | 3454.17 | 3467.53 | 3480.85 | 3494.11 | 3507.32 | 3520.48 | 3533.59 | 3546.65 |
| 18. | 3559.67 | 3572.64 | 3585.56 | 3598.43 | 3611.26 | 3624.04 | 3636.78 | 3649.48 |
| 19. | 3662.12 | 3674.73 | 3687.29 | 3699.81 | 3712.29 | 3724.73 | 3737.12 | 3749.48 |
| 20. | 3761.79 | 3774.07 | 3786.30 | 3798.49 | 3810.65 | 3822.77 | 3834.84 | 3846.88 |
| 21. | 3858.89 | 3870.85 | 3882.78 | 3894.67 | 3906.53 | 3918.35 | 3930.13 | 3941.88 |
| 22. | 3953.60 | 3965.28 | 3976.92 | 3988.53 | 4000.11 | 4011.66 | 4023.17 | 4034.65 |
| 23. | 4046.09 | 4057.51 | 4068.89 | 4080.24 | 4091.56 | 4102.84 | 4114.10 | 4125.32 |
| 24. | 4136.52 | 4147.68 | 4158.82 | 4169.92 | 4181.00 | 4192.05 | 4203.06 | 4214.05 |
| 25. | 4225.01 | 4235.94 | 4246.85 | 4257.72 | 4268.57 | 4279.39 | 4290.18 | 4300.95 |
| 26. | 4311.69 | 4322.40 | 4333.08 | 4343.74 | 4354.38 | 4364.99 | 4375.57 | 4386.12 |
| 27. | 4396.65 | 4407.16 | 4417.64 | 4428.10 | 4438.53 | 4448.93 | 4459.32 | 4469.68 |
| 28. | 4480.01 | 4490.32 | 4500.61 | 4510.87 | 4521.11 | 4531.33 | 4541.52 | 4551.70 |
| 29. | 4561.84 | 4571.97 | 4582.07 | 4592.16 | 4602.21 | 4612.25 | 4622.27 | 4632.26 |
| 30. | 4642.23 | 4652.19 | 4662.12 | 4672.02 | 4681.91 | 4691.78 | 4701.63 | 4711.45 |
| 31. | 4721.26 | 4731.04 | 4740.81 | 4750.55 | 4760.28 | 4769.98 | 4779.67 | 4789.33 |
| 32. | 4798.98 | 4808.61 | 4818.21 | 4827.80 | 4837.37 | 4846.92 | 4856.45 | 4865.97 |
| 33. | 4875.46 | 4884.94 | 4894.40 | 4903.83 | 4913.26 | 4922.66 | 4932.04 | 4941.41 |
| 34. | 4950.76 | 4960.09 | 4969.41 | 4978.71 | 4987.99 | 4997.25 | 5006.50 | 5015.72 |
| 35. | 5024.94 | 5034.13 | 5043.31 | 5052.47 | 5061.61 | 5070.74 | 5079.85 | 5088.95 |
| 36. | 5098.03 | 5107.09 | 5116.14 | 5125.17 | 5134.19 | 5143.19 | 5152.17 | 5161.14 |
| 37. | 5170.09 | 5179.03 | 5187.95 | 5196.85 | 5205.75 | 5214.62 | 5223.48 | 5232.33 |
| 38. | 5241.16 | 5249.98 | 5258.78 | 5267.56 | 5276.34 | 5285.09 | 5293.84 | 5302.56 |
| 39. | 5311.28 | 5319.98 | 5328.66 | 5337.34 | 5345.99 | 5354.64 | 5363.27 | 5371.88 |
| 40. | 5380.48 | 5389.07 | 5397.65 | 5406.21 | 5414.75 | 5423.29 | 5431.81 | 5440.32 |
| 41. | 5448.81 | 5457.29 | 5465.76 | 5474.21 | 5482.65 | 5491.08 | 5499.50 | 5507.90 |
| 42. | 5516.29 | 5524.67 | 5533.03 | 5541.38 | 5549.72 | 5558.05 | 5566.36 | 5574.67 |
| 43. | 5582.95 | 5591.23 | 5599.50 | 5607.75 | 5615.99 | 5624.22 | 5632.44 | 5640.64 |
| 44. | 5648.83 | 5657.01 | 5665.18 | 5673.34 | 5681.48 | 5689.62 | 5697.74 | 5705.85 |
| 45. | 5713.95 | 5722.04 | 5730.11 | 5738.18 | 5746.23 | 5754.28 | 5762.31 | 5770.33 |
| 46. | 5778.34 | 5786.33 | 5794.32 | 5802.30 | 5810.26 | 5818.21 | 5826.16 | 5834.09 |
| 47. | 5842.01 | 5849.92 | 5857.82 | 5865.71 | 5873.59 | 5881.46 | 5889.32 | 5897.16 |
| 48. | 5905.00 | 5912.83 | 5920.64 | 5928.45 | 5936.24 | 5944.03 | 5951.80 | 5959.57 |
| 49. | 5967.32 | 5975.07 | 5982.80 | 5990.53 | 5998.24 | 6005.95 | 6013.64 | 6021.33 |
| 50. | 6029.00 | 6036.67 | 6044.32 | 6051.97 | 6059.61 | 6067.23 | 6074.85 | 6082.46 |
| 51. | 6090.06 | 6097.65 | 6105.22 | 6112.80 | 6120.36 | 6127.91 | 6135.45 | 6142.98 |

TABLE 4-continued

The outer radius of each subzone for a 1.5D, 15-mm, 8-level diffractive lens.
The area of each zone is twice that of the corresponding 3D lens (Table 3).

| Zone # | Subzone # | | | | | | | |
|---|---|---|---|---|---|---|---|---|
| | 1 | 2 | 3 | 4 | 5 | 6 | 7 | 8 |
| 52. | 6150.51 | 6158.02 | 6165.52 | 6173.02 | 6180.51 | 6187.99 | 6195.45 | 6202.91 |
| 53. | 6210.37 | 6217.81 | 6225.24 | 6232.67 | 6240.08 | 6247.49 | 6254.89 | 6262.27 |
| 54. | 6269.65 | 6277.03 | 6284.39 | 6291.74 | 6299.09 | 6306.43 | 6313.76 | 6321.08 |
| 55. | 6328.39 | 6335.69 | 6342.99 | 6350.27 | 6357.55 | 6364.82 | 6372.08 | 6379.34 |
| 56. | 6386.58 | 6393.82 | 6401.05 | 6408.27 | 6415.48 | 6422.68 | 6429.88 | 6437.07 |
| 57. | 6444.25 | 6451.42 | 6458.59 | 6465.74 | 6472.89 | 6480.03 | 6487.16 | 6494.29 |
| 58. | 6501.41 | 6508.51 | 6515.62 | 6522.71 | 6529.80 | 6536.87 | 6543.95 | 6551.01 |
| 59. | 6558.06 | 6565.11 | 6572.15 | 6579.18 | 6586.21 | 6593.23 | 6600.24 | 6607.24 |
| 60. | 6614.24 | 6621.22 | 6628.21 | 6635.18 | 6642.14 | 6649.10 | 6656.06 | 6663.00 |
| 61. | 6669.94 | 6676.87 | 6683.79 | 6690.70 | 6697.61 | 6704.51 | 6711.41 | 6718.29 |
| 62. | 6725.17 | 6732.05 | 6738.91 | 6745.77 | 6752.62 | 6759.47 | 6766.31 | 6773.14 |
| 63. | 6779.96 | 6786.78 | 6793.59 | 6800.40 | 6807.19 | 6813.98 | 6820.77 | 6827.54 |
| 64. | 6834.31 | 6841.08 | 6847.83 | 6854.58 | 6861.33 | 6868.06 | 6874.79 | 6881.52 |
| 65. | 6888.23 | 6894.94 | 6901.65 | 6908.34 | 6915.04 | 6921.72 | 6928.40 | 6935.07 |
| 66. | 6941.73 | 6948.39 | 6955.05 | 6961.69 | 6968.33 | 6974.96 | 6981.59 | 6988.21 |
| 67. | 6994.83 | 7001.44 | 7008.04 | 7014.63 | 7021.22 | 7027.81 | 7034.38 | 7040.95 |
| 68. | 7047.52 | 7054.08 | 7060.63 | 7067.18 | 7073.72 | 7080.25 | 7086.78 | 7093.30 |
| 69. | 7099.82 | 7106.33 | 7112.84 | 7119.34 | 7125.83 | 7132.31 | 7138.80 | 7145.27 |
| 70. | 7151.74 | 7158.20 | 7164.66 | 7171.11 | 7177.56 | 7184.00 | 7190.43 | 7196.86 |
| 71. | 7203.28 | 7209.70 | 7216.11 | 7222.52 | 7228.92 | 7235.31 | 7241.70 | 7248.09 |
| 72. | 7254.46 | 7260.84 | 7267.20 | 7273.56 | 7279.92 | 7286.27 | 7292.61 | 7298.95 |
| 73. | 7305.28 | 7311.61 | 7317.93 | 7324.25 | 7330.56 | 7336.87 | 7343.17 | 7349.46 |
| 74. | 7355.75 | 7362.04 | 7368.32 | 7374.59 | 7380.86 | 7387.12 | 7393.38 | 7399.63 |
| 75. | 7405.88 | 7412.12 | 7418.36 | 7424.59 | 7430.81 | 7437.03 | 7443.25 | 7449.46 |
| 76. | 7455.67 | 7461.87 | 7468.06 | 7474.25 | 7480.43 | 7486.61 | 7492.79 | 7498.96 |

TABLE 5

The outer radius of each subzone for a 1D, 15-mm, 8-level diffractive lens. The
area of each zone is three times that of the corresponding 3D lens (Table 3).
The area of each zone is twice that of the corresponding 2D lens (Table 4).

| Zone # | | | | | | | | |
|---|---|---|---|---|---|---|---|---|
| 1  | 372.49  | 526.78  | 645.17  | 744.98  | 832.92  | 912.41  | 985.52  | 1053.57 |
| 2  | 1117.47 | 1177.92 | 1235.41 | 1290.35 | 1343.04 | 1393.74 | 1442.65 | 1489.97 |
| 3  | 1535.82 | 1580.35 | 1623.65 | 1665.83 | 1706.97 | 1747.14 | 1786.41 | 1824.83 |
| 4  | 1862.46 | 1899.34 | 1935.52 | 1971.04 | 2005.93 | 2040.22 | 2073.95 | 2107.13 |
| 5  | 2139.80 | 2171.98 | 2203.69 | 2234.95 | 2265.78 | 2296.19 | 2326.21 | 2355.84 |
| 6  | 2385.11 | 2414.02 | 2442.59 | 2470.83 | 2498.75 | 2526.36 | 2553.67 | 2580.70 |
| 7  | 2607.44 | 2633.91 | 2660.12 | 2686.08 | 2711.78 | 2737.24 | 2762.47 | 2787.47 |
| 8  | 2812.25 | 2836.81 | 2861.16 | 2885.31 | 2909.25 | 2933.00 | 2956.56 | 2979.93 |
| 9  | 3003.12 | 3026.14 | 3048.98 | 3071.64 | 3094.15 | 3116.49 | 3138.67 | 3160.70 |
| 10 | 3182.57 | 3204.29 | 3225.87 | 3247.31 | 3268.60 | 3289.76 | 3310.78 | 3331.67 |
| 11 | 3352.42 | 3373.05 | 3393.56 | 3413.94 | 3434.20 | 3454.35 | 3474.37 | 3494.28 |
| 12 | 3514.08 | 3533.77 | 3553.34 | 3572.81 | 3592.18 | 3611.44 | 3630.60 | 3649.66 |
| 13 | 3668.62 | 3687.48 | 3706.24 | 3724.92 | 3743.49 | 3761.98 | 3780.38 | 3798.68 |
| 14 | 3816.90 | 3835.04 | 3853.08 | 3871.05 | 3888.93 | 3906.72 | 3924.44 | 3942.08 |
| 15 | 3959.64 | 3977.12 | 3994.53 | 4011.86 | 4029.11 | 4046.29 | 4063.40 | 4080.44 |
| 16 | 4097.41 | 4114.30 | 4131.13 | 4147.89 | 4164.58 | 4181.21 | 4197.77 | 4214.26 |
| 17 | 4230.69 | 4247.06 | 4263.36 | 4279.60 | 4295.78 | 4311.90 | 4327.96 | 4343.96 |
| 18 | 4359.90 | 4375.79 | 4391.61 | 4407.38 | 4423.09 | 4438.75 | 4454.35 | 4469.90 |
| 19 | 4485.39 | 4500.83 | 4516.22 | 4531.56 | 4546.84 | 4562.07 | 4577.25 | 4592.39 |
| 20 | 4607.47 | 4622.50 | 4637.48 | 4652.42 | 4667.31 | 4682.15 | 4696.94 | 4711.69 |
| 21 | 4726.39 | 4741.04 | 4755.65 | 4770.22 | 4784.74 | 4799.22 | 4813.65 | 4828.04 |
| 22 | 4842.39 | 4856.70 | 4870.96 | 4885.18 | 4899.36 | 4913.50 | 4927.60 | 4941.66 |
| 23 | 4955.68 | 4969.66 | 4983.60 | 4997.50 | 5011.36 | 5025.19 | 5038.97 | 5052.72 |
| 24 | 5066.43 | 5080.11 | 5093.75 | 5107.35 | 5120.91 | 5134.44 | 5147.94 | 5161.40 |
| 25 | 5174.82 | 5188.21 | 5201.56 | 5214.88 | 5228.17 | 5241.42 | 5254.64 | 5267.83 |
| 26 | 5280.98 | 5294.10 | 5307.19 | 5320.24 | 5333.27 | 5346.26 | 5359.22 | 5372.15 |
| 27 | 5385.05 | 5397.92 | 5410.75 | 5423.56 | 5436.34 | 5449.08 | 5461.80 | 5474.49 |
| 28 | 5487.14 | 5499.77 | 5512.37 | 5524.94 | 5537.49 | 5550.00 | 5562.49 | 5574.94 |
| 29 | 5587.37 | 5599.78 | 5612.15 | 5624.50 | 5636.82 | 5649.11 | 5661.38 | 5673.62 |
| 30 | 5685.84 | 5698.03 | 5710.19 | 5722.32 | 5734.44 | 5746.52 | 5758.58 | 5770.62 |
| 31 | 5782.62 | 5794.61 | 5806.57 | 5818.50 | 5830.42 | 5842.30 | 5854.17 | 5866.00 |
| 32 | 5877.82 | 5889.61 | 5901.38 | 5913.12 | 5924.84 | 5936.54 | 5948.21 | 5959.87 |
| 33 | 5971.49 | 5983.10 | 5994.69 | 6006.25 | 6017.79 | 6029.30 | 6040.80 | 6052.27 |
| 34 | 6063.72 | 6075.15 | 6086.56 | 6097.95 | 6109.32 | 6120.66 | 6131.99 | 6143.29 |
| 35 | 6154.57 | 6165.83 | 6177.07 | 6188.30 | 6199.50 | 6210.68 | 6221.84 | 6232.98 |
| 36 | 6244.10 | 6255.20 | 6266.28 | 6277.34 | 6288.38 | 6299.40 | 6310.41 | 6321.39 |

TABLE 5-continued

The outer radius of each subzone for a 1D, 15-mm, 8-level diffractive lens. The
area of each zone is three times that of the corresponding 3D lens (Table 3).
The area of each zone is twice that of the corresponding 2D lens (Table 4).

| Zone # | | | | | | | | |
|---|---|---|---|---|---|---|---|---|
| 37 | 6332.36 | 6343.30 | 6354.23 | 6365.14 | 6376.03 | 6386.90 | 6397.75 | 6408.59 |
| 38 | 6419.40 | 6430.20 | 6440.98 | 6451.74 | 6462.49 | 6473.21 | 6483.92 | 6494.61 |
| 39 | 6505.29 | 6515.94 | 6526.58 | 6537.20 | 6547.80 | 6558.39 | 6568.96 | 6579.51 |
| 40 | 6590.05 | 6600.57 | 6611.07 | 6621.56 | 6632.02 | 6642.48 | 6652.91 | 6663.33 |
| 41 | 6673.74 | 6684.12 | 6694.49 | 6704.85 | 6715.19 | 6725.51 | 6735.82 | 6746.11 |
| 42 | 6756.39 | 6766.65 | 6776.89 | 6787.12 | 6797.33 | 6807.53 | 6817.72 | 6827.88 |
| 43 | 6838.04 | 6848.17 | 6858.30 | 6868.41 | 6878.50 | 6888.58 | 6898.64 | 6908.69 |
| 44 | 6918.72 | 6928.74 | 6938.75 | 6948.74 | 6958.72 | 6968.68 | 6978.63 | 6988.56 |
| 45 | 6998.48 | 7008.39 | 7018.28 | 7028.16 | 7038.02 | 7047.87 | 7057.71 | 7067.53 |
| 46 | 7077.34 | 7087.14 | 7096.92 | 7106.69 | 7116.44 | 7126.18 | 7135.91 | 7145.63 |
| 47 | 7155.33 | 7165.02 | 7174.70 | 7184.36 | 7194.01 | 7203.64 | 7213.27 | 7222.88 |
| 48 | 7232.48 | 7242.06 | 7251.64 | 7261.20 | 7270.75 | 7280.28 | 7289.80 | 7299.32 |
| 49 | 7308.81 | 7318.30 | 7327.77 | 7337.23 | 7346.68 | 7356.12 | 7365.54 | 7374.96 |
| 50 | 7384.36 | 7393.75 | 7403.12 | 7412.49 | 7421.84 | 7431.18 | 7440.51 | 7449.83 |
| 51 | 7459.14 | 7468.43 | 7477.72 | 7486.99 | 7496.25 | 7505.50 | 7514.74 | 7523.96 |

TABLE 6

The outer radius of each subzone for a 2D, 15-mm, 8-level diffractive lens.

| | Subzone # | | | | | | | |
|---|---|---|---|---|---|---|---|---|
| Zone # | 1 | 2 | 3 | 4 | 5 | 6 | 7 | 8 |
| 1. | 263.39 | 372.49 | 456.21 | 526.78 | 588.96 | 645.17 | 696.87 | 744.98 |
| 2. | 790.17 | 832.92 | 873.57 | 912.41 | 949.67 | 985.52 | 1020.11 | 1053.57 |
| 3. | 1085.99 | 1117.47 | 1148.10 | 1177.92 | 1207.01 | 1235.41 | 1263.18 | 1290.35 |
| 4. | 1316.96 | 1343.04 | 1368.62 | 1393.74 | 1418.41 | 1442.65 | 1466.50 | 1489.97 |
| 5. | 1513.07 | 1535.82 | 1558.24 | 1580.35 | 1602.15 | 1623.65 | 1644.88 | 1665.83 |
| 6. | 1686.53 | 1706.97 | 1727.17 | 1747.14 | 1766.88 | 1786.41 | 1805.72 | 1824.83 |
| 7. | 1843.74 | 1862.46 | 1880.99 | 1899.34 | 1917.52 | 1935.52 | 1953.36 | 1971.04 |
| 8. | 1988.56 | 2005.93 | 2023.15 | 2040.22 | 2057.15 | 2073.95 | 2090.60 | 2107.13 |
| 9. | 2123.53 | 2139.80 | 2155.95 | 2171.98 | 2187.89 | 2203.69 | 2219.37 | 2234.95 |
| 10. | 2250.42 | 2265.78 | 2281.04 | 2296.19 | 2311.25 | 2326.21 | 2341.07 | 2355.84 |
| 11. | 2370.52 | 2385.11 | 2399.61 | 2414.02 | 2428.35 | 2442.59 | 2456.75 | 2470.83 |
| 12. | 2484.83 | 2498.75 | 2512.59 | 2526.36 | 2540.05 | 2553.67 | 2567.22 | 2580.70 |
| 13. | 2594.10 | 2607.44 | 2620.71 | 2633.91 | 2647.05 | 2660.12 | 2673.13 | 2686.08 |
| 14. | 2698.96 | 2711.78 | 2724.54 | 2737.24 | 2749.89 | 2762.47 | 2775.00 | 2787.47 |
| 15. | 2799.89 | 2812.25 | 2824.56 | 2836.81 | 2849.01 | 2861.16 | 2873.26 | 2885.31 |
| 16. | 2897.30 | 2909.25 | 2921.15 | 2933.00 | 2944.80 | 2956.56 | 2968.27 | 2979.93 |
| 17. | 2991.55 | 3003.12 | 3014.65 | 3026.14 | 3037.58 | 3048.98 | 3060.33 | 3071.64 |
| 18. | 3082.92 | 3094.15 | 3105.34 | 3116.49 | 3127.60 | 3138.67 | 3149.70 | 3160.70 |
| 19. | 3171.65 | 3182.57 | 3193.45 | 3204.29 | 3215.10 | 3225.87 | 3236.61 | 3247.31 |
| 20. | 3257.97 | 3268.60 | 3279.20 | 3289.76 | 3300.28 | 3310.78 | 3321.24 | 3331.67 |
| 21. | 3342.06 | 3352.42 | 3362.76 | 3373.05 | 3383.32 | 3393.56 | 3403.77 | 3413.94 |
| 22. | 3424.09 | 3434.20 | 3444.29 | 3454.35 | 3464.37 | 3474.37 | 3484.34 | 3494.28 |
| 23. | 3504.19 | 3514.08 | 3523.94 | 3533.77 | 3543.57 | 3553.34 | 3563.09 | 3572.81 |
| 24. | 3582.51 | 3592.18 | 3601.82 | 3611.44 | 3621.03 | 3630.60 | 3640.14 | 3649.66 |
| 25. | 3659.15 | 3668.62 | 3678.06 | 3687.48 | 3696.87 | 3706.24 | 3715.59 | 3724.92 |
| 26. | 3734.22 | 3743.49 | 3752.75 | 3761.98 | 3771.19 | 3780.38 | 3789.54 | 3798.68 |
| 27. | 3807.80 | 3816.90 | 3825.98 | 3835.04 | 3844.07 | 3853.08 | 3862.08 | 3871.05 |
| 28. | 3880.00 | 3888.93 | 3897.84 | 3906.72 | 3915.59 | 3924.44 | 3933.27 | 3942.08 |
| 29. | 3950.87 | 3959.64 | 3968.39 | 3977.12 | 3985.83 | 3994.53 | 4003.20 | 4011.86 |
| 30. | 4020.49 | 4029.11 | 4037.71 | 4046.29 | 4054.86 | 4063.40 | 4071.93 | 4080.44 |
| 31. | 4088.93 | 4097.41 | 4105.86 | 4114.30 | 4122.73 | 4131.13 | 4139.52 | 4147.89 |
| 32. | 4156.25 | 4164.58 | 4172.90 | 4181.21 | 4189.50 | 4197.77 | 4206.02 | 4214.26 |
| 33. | 4222.48 | 4230.69 | 4238.88 | 4247.06 | 4255.22 | 4263.36 | 4271.49 | 4279.60 |
| 34. | 4287.70 | 4295.78 | 4303.85 | 4311.90 | 4319.94 | 4327.96 | 4335.97 | 4343.96 |
| 35. | 4351.94 | 4359.90 | 4367.85 | 4375.79 | 4383.71 | 4391.61 | 4399.50 | 4407.38 |
| 36. | 4415.24 | 4423.09 | 4430.93 | 4438.75 | 4446.56 | 4454.35 | 4462.13 | 4469.90 |
| 37. | 4477.65 | 4485.39 | 4493.12 | 4500.83 | 4508.53 | 4516.22 | 4523.89 | 4531.56 |
| 38. | 4539.20 | 4546.84 | 4554.46 | 4562.07 | 4569.67 | 4577.25 | 4584.83 | 4592.39 |
| 39. | 4599.93 | 4607.47 | 4614.99 | 4622.50 | 4630.00 | 4637.48 | 4644.96 | 4652.42 |
| 40. | 4659.87 | 4667.31 | 4674.73 | 4682.15 | 4689.55 | 4696.94 | 4704.32 | 4711.69 |
| 41. | 4719.04 | 4726.39 | 4733.72 | 4741.04 | 4748.35 | 4755.65 | 4762.94 | 4770.22 |
| 42. | 4777.49 | 4784.74 | 4791.99 | 4799.22 | 4806.44 | 4813.65 | 4820.85 | 4828.04 |
| 43. | 4835.22 | 4842.39 | 4849.55 | 4856.70 | 4863.83 | 4870.96 | 4878.08 | 4885.18 |
| 44. | 4892.28 | 4899.36 | 4906.44 | 4913.50 | 4920.56 | 4927.60 | 4934.64 | 4941.66 |
| 45. | 4948.67 | 4955.68 | 4962.67 | 4969.66 | 4976.63 | 4983.60 | 4990.55 | 4997.50 |
| 46. | 5004.44 | 5011.36 | 5018.28 | 5025.19 | 5032.08 | 5038.97 | 5045.85 | 5052.72 |
| 47. | 5059.58 | 5066.43 | 5073.28 | 5080.11 | 5086.93 | 5093.75 | 5100.55 | 5107.35 |

TABLE 6-continued

The outer radius of each subzone for a 2D, 15-mm, 8-level diffractive lens.

| Zone # | Subzone # | | | | | | | |
|---|---|---|---|---|---|---|---|---|
| | 1 | 2 | 3 | 4 | 5 | 6 | 7 | 8 |
| 48. | 5114.13 | 5120.91 | 5127.68 | 5134.44 | 5141.19 | 5147.94 | 5154.67 | 5161.40 |
| 49. | 5168.11 | 5174.82 | 5181.52 | 5188.21 | 5194.89 | 5201.56 | 5208.23 | 5214.88 |
| 50. | 5221.53 | 5228.17 | 5234.80 | 5241.42 | 5248.04 | 5254.64 | 5261.24 | 5267.83 |
| 51. | 5274.41 | 5280.98 | 5287.54 | 5294.10 | 5300.65 | 5307.19 | 5313.72 | 5320.24 |
| 52. | 5326.76 | 5333.27 | 5339.77 | 5346.26 | 5352.74 | 5359.22 | 5365.69 | 5372.15 |
| 53. | 5378.60 | 5385.05 | 5391.49 | 5397.92 | 5404.34 | 5410.75 | 5417.16 | 5423.56 |
| 54. | 5429.95 | 5436.34 | 5442.71 | 5449.08 | 5455.44 | 5461.80 | 5468.15 | 5474.49 |
| 55. | 5480.82 | 5487.14 | 5493.46 | 5499.77 | 5506.08 | 5512.37 | 5518.66 | 5524.94 |
| 56. | 5531.22 | 5537.49 | 5543.75 | 5550.00 | 5556.25 | 5562.49 | 5568.72 | 5574.94 |
| 57. | 5581.16 | 5587.37 | 5593.58 | 5599.78 | 5605.97 | 5612.15 | 5618.33 | 5624.50 |
| 58. | 5630.66 | 5636.82 | 5642.97 | 5649.11 | 5655.25 | 5661.38 | 5667.51 | 5673.62 |
| 59. | 5679.73 | 5685.84 | 5691.94 | 5698.03 | 5704.11 | 5710.19 | 5716.26 | 5722.32 |
| 60. | 5728.38 | 5734.44 | 5740.48 | 5746.52 | 5752.55 | 5758.58 | 5764.60 | 5770.62 |
| 61. | 5776.62 | 5782.62 | 5788.62 | 5794.61 | 5800.59 | 5806.57 | 5812.54 | 5818.50 |
| 62. | 5824.46 | 5830.42 | 5836.36 | 5842.30 | 5848.24 | 5854.17 | 5860.09 | 5866.00 |
| 63. | 5871.91 | 5877.82 | 5883.72 | 5889.61 | 5895.50 | 5901.38 | 5907.25 | 5913.12 |
| 64. | 5918.98 | 5924.84 | 5930.69 | 5936.54 | 5942.38 | 5948.21 | 5954.04 | 5959.87 |
| 65. | 5965.68 | 5971.49 | 5977.30 | 5983.10 | 5988.90 | 5994.69 | 6000.47 | 6006.25 |
| 66. | 6012.02 | 6017.79 | 6023.55 | 6029.30 | 6035.05 | 6040.80 | 6046.54 | 6052.27 |
| 67. | 6058.00 | 6063.72 | 6069.44 | 6075.15 | 6080.86 | 6086.56 | 6092.26 | 6097.95 |
| 68. | 6103.64 | 6109.32 | 6114.99 | 6120.66 | 6126.33 | 6131.99 | 6137.64 | 6143.29 |
| 69. | 6148.93 | 6154.57 | 6160.20 | 6165.83 | 6171.46 | 6177.07 | 6182.69 | 6188.30 |
| 70. | 6193.90 | 6199.50 | 6205.09 | 6210.68 | 6216.26 | 6221.84 | 6227.41 | 6232.98 |
| 71. | 6238.54 | 6244.10 | 6249.65 | 6255.20 | 6260.74 | 6266.28 | 6271.81 | 6277.34 |
| 72. | 6282.86 | 6288.38 | 6293.90 | 6299.40 | 6304.91 | 6310.41 | 6315.90 | 6321.39 |
| 73. | 6326.88 | 6332.36 | 6337.83 | 6343.30 | 6348.77 | 6354.23 | 6359.69 | 6365.14 |
| 74. | 6370.59 | 6376.03 | 6381.47 | 6386.90 | 6392.33 | 6397.75 | 6403.17 | 6408.59 |
| 75. | 6414.00 | 6419.40 | 6424.81 | 6430.20 | 6435.59 | 6440.98 | 6446.37 | 6451.74 |
| 76. | 6457.12 | 6462.49 | 6467.85 | 6473.21 | 6478.57 | 6483.92 | 6489.27 | 6494.61 |
| 77. | 6499.95 | 6505.29 | 6510.62 | 6515.94 | 6521.26 | 6526.58 | 6531.89 | 6537.20 |
| 78. | 6542.51 | 6547.80 | 6553.10 | 6558.39 | 6563.68 | 6568.96 | 6574.24 | 6579.51 |
| 79. | 6584.78 | 6590.05 | 6595.31 | 6600.57 | 6605.82 | 6611.07 | 6616.32 | 6621.56 |
| 80. | 6626.79 | 6632.02 | 6637.25 | 6642.48 | 6647.70 | 6652.91 | 6658.12 | 6663.33 |
| 81. | 6668.54 | 6673.74 | 6678.93 | 6684.12 | 6689.31 | 6694.49 | 6699.67 | 6704.85 |
| 82. | 6710.02 | 6715.19 | 6720.35 | 6725.51 | 6730.67 | 6735.82 | 6740.97 | 6746.11 |
| 83. | 6751.25 | 6756.39 | 6761.52 | 6766.65 | 6771.77 | 6776.89 | 6782.01 | 6787.12 |
| 84. | 6792.23 | 6797.33 | 6802.44 | 6807.53 | 6812.63 | 6817.72 | 6822.80 | 6827.88 |
| 85. | 6832.96 | 6838.04 | 6843.11 | 6848.17 | 6853.24 | 6858.30 | 6863.35 | 6868.41 |
| 86. | 6873.45 | 6878.50 | 6883.54 | 6888.58 | 6893.61 | 6898.64 | 6903.67 | 6908.69 |
| 87. | 6913.71 | 6918.72 | 6923.74 | 6928.74 | 6933.75 | 6938.75 | 6943.75 | 6948.74 |
| 88. | 6953.73 | 6958.72 | 6963.70 | 6968.68 | 6973.66 | 6978.63 | 6983.60 | 6988.56 |
| 89. | 6993.52 | 6998.48 | 7003.44 | 7008.39 | 7013.34 | 7018.28 | 7023.22 | 7028.16 |
| 90. | 7033.09 | 7038.02 | 7042.95 | 7047.87 | 7052.79 | 7057.71 | 7062.62 | 7067.53 |
| 91. | 7072.44 | 7077.34 | 7082.24 | 7087.14 | 7092.03 | 7096.92 | 7101.80 | 7106.69 |
| 92. | 7111.57 | 7116.44 | 7121.31 | 7126.18 | 7131.05 | 7135.91 | 7140.77 | 7145.63 |
| 93. | 7150.48 | 7155.33 | 7160.18 | 7165.02 | 7169.86 | 7174.70 | 7179.53 | 7184.36 |
| 94. | 7189.18 | 7194.01 | 7198.83 | 7203.64 | 7208.46 | 7213.27 | 7218.08 | 7222.88 |
| 95. | 7227.68 | 7232.48 | 7237.27 | 7242.06 | 7246.85 | 7251.64 | 7256.42 | 7261.20 |
| 96. | 7265.97 | 7270.75 | 7275.52 | 7280.28 | 7285.04 | 7289.80 | 7294.56 | 7299.32 |
| 97. | 7304.07 | 7308.81 | 7313.56 | 7318.30 | 7323.04 | 7327.77 | 7332.50 | 7337.23 |
| 98. | 7341.96 | 7346.68 | 7351.40 | 7356.12 | 7360.83 | 7365.54 | 7370.25 | 7374.96 |
| 99. | 7379.66 | 7384.36 | 7389.05 | 7393.75 | 7398.44 | 7403.12 | 7407.81 | 7412.49 |
| 100. | 7417.17 | 7421.84 | 7426.51 | 7431.18 | 7435.85 | 7440.51 | 7445.17 | 7449.83 |
| 101. | 7454.49 | 7459.14 | 7463.79 | 7468.43 | 7473.08 | 7477.72 | 7482.35 | 7486.99 |
| 102. | 7491.62 | 7496.25 | 7500.87 | 7505.50 | 7510.12 | 7514.74 | 7519.35 | 7523.96 |

TABLE 7

The outer radius of each subzone for a 2.5D, 15-mm, 8-level diffractive lens.

| Zone# | Subzone # | | | | | | | |
|---|---|---|---|---|---|---|---|---|
| | 1 | 2 | 3 | 4 | 5 | 6 | 7 | 8 |
| 1. | 235.58 | 333.17 | 408.04 | 471.17 | 526.78 | 577.06 | 623.30 | 666.33 |
| 2. | 706.75 | 744.98 | 781.34 | 816.09 | 849.41 | 881.48 | 912.41 | 942.34 |
| 3. | 971.34 | 999.50 | 1026.89 | 1053.57 | 1079.58 | 1104.99 | 1129.82 | 1154.12 |
| 4. | 1177.92 | 1201.25 | 1224.13 | 1246.60 | 1268.66 | 1290.35 | 1311.68 | 1332.67 |
| 5. | 1353.33 | 1373.68 | 1393.74 | 1413.51 | 1433.00 | 1452.24 | 1471.22 | 1489.97 |
| 6. | 1508.48 | 1526.76 | 1544.83 | 1562.69 | 1580.35 | 1597.81 | 1615.09 | 1632.18 |
| 7. | 1649.09 | 1665.83 | 1682.41 | 1698.82 | 1715.08 | 1731.18 | 1747.14 | 1762.95 |

TABLE 7-continued

The outer radius of each subzone for a 2.5D, 15-mm, 8-level diffractive lens.

| Zone# | Subzone # | | | | | | | |
|---|---|---|---|---|---|---|---|---|
| | 1 | 2 | 3 | 4 | 5 | 6 | 7 | 8 |
| 8. | 1778.62 | 1794.16 | 1809.56 | 1824.83 | 1839.97 | 1854.99 | 1869.89 | 1884.68 |
| 9. | 1899.34 | 1913.90 | 1928.34 | 1942.68 | 1956.91 | 1971.04 | 1985.07 | 1999.00 |
| 10. | 2012.83 | 2026.57 | 2040.22 | 2053.78 | 2067.24 | 2080.62 | 2093.92 | 2107.13 |
| 11. | 2120.26 | 2133.31 | 2146.28 | 2159.17 | 2171.98 | 2184.72 | 2197.38 | 2209.98 |
| 12. | 2222.50 | 2234.95 | 2247.33 | 2259.65 | 2271.89 | 2284.08 | 2296.19 | 2308.25 |
| 13. | 2320.24 | 2332.17 | 2344.03 | 2355.84 | 2367.59 | 2379.29 | 2390.92 | 2402.50 |
| 14. | 2414.02 | 2425.49 | 2436.90 | 2448.26 | 2459.57 | 2470.83 | 2482.04 | 2493.19 |
| 15. | 2504.30 | 2515.35 | 2526.36 | 2537.32 | 2548.23 | 2559.10 | 2569.92 | 2580.70 |
| 16. | 2591.43 | 2602.11 | 2612.76 | 2623.36 | 2633.91 | 2644.43 | 2654.90 | 2665.33 |
| 17. | 2675.72 | 2686.08 | 2696.39 | 2706.66 | 2716.89 | 2727.09 | 2737.24 | 2747.36 |
| 18. | 2757.44 | 2767.49 | 2777.50 | 2787.47 | 2797.41 | 2807.31 | 2817.18 | 2827.01 |
| 19. | 2836.81 | 2846.58 | 2856.31 | 2866.01 | 2875.67 | 2885.31 | 2894.91 | 2904.48 |
| 20. | 2914.02 | 2923.53 | 2933.00 | 2942.45 | 2951.86 | 2961.25 | 2970.61 | 2979.93 |
| 21. | 2989.23 | 2998.50 | 3007.74 | 3016.95 | 3026.14 | 3035.29 | 3044.42 | 3053.52 |
| 22. | 3062.60 | 3071.64 | 3080.67 | 3089.66 | 3098.63 | 3107.57 | 3116.49 | 3125.38 |
| 23. | 3134.25 | 3143.09 | 3151.90 | 3160.70 | 3169.46 | 3178.21 | 3186.93 | 3195.62 |
| 24. | 3204.29 | 3212.94 | 3221.57 | 3230.17 | 3238.75 | 3247.31 | 3255.84 | 3264.35 |
| 25. | 3272.84 | 3281.31 | 3289.76 | 3298.18 | 3306.58 | 3314.97 | 3323.33 | 3331.67 |
| 26. | 3339.99 | 3348.28 | 3356.56 | 3364.82 | 3373.05 | 3381.27 | 3389.47 | 3397.65 |
| 27. | 3405.80 | 3413.94 | 3422.06 | 3430.16 | 3438.24 | 3446.30 | 3454.35 | 3462.37 |
| 28. | 3470.37 | 3478.36 | 3486.33 | 3494.28 | 3502.21 | 3510.13 | 3518.03 | 3525.90 |
| 29. | 3533.77 | 3541.61 | 3549.44 | 3557.25 | 3565.04 | 3572.81 | 3580.57 | 3588.31 |
| 30. | 3596.04 | 3603.75 | 3611.44 | 3619.12 | 3626.78 | 3634.42 | 3642.05 | 3649.66 |
| 31. | 3657.25 | 3664.83 | 3672.40 | 3679.95 | 3687.48 | 3695.00 | 3702.50 | 3709.99 |
| 32. | 3717.46 | 3724.92 | 3732.36 | 3739.79 | 3747.20 | 3754.60 | 3761.98 | 3769.35 |
| 33. | 3776.70 | 3784.05 | 3791.37 | 3798.68 | 3805.98 | 3813.27 | 3820.54 | 3827.79 |
| 34. | 3835.04 | 3842.26 | 3849.48 | 3856.68 | 3863.87 | 3871.05 | 3878.21 | 3885.36 |
| 35. | 3892.49 | 3899.62 | 3906.72 | 3913.82 | 3920.91 | 3927.98 | 3935.03 | 3942.08 |
| 36. | 3949.11 | 3956.13 | 3963.14 | 3970.14 | 3977.12 | 3984.09 | 3991.05 | 3998.00 |
| 37. | 4004.93 | 4011.86 | 4018.77 | 4025.67 | 4032.56 | 4039.43 | 4046.29 | 4053.15 |
| 38. | 4059.99 | 4066.82 | 4073.63 | 4080.44 | 4087.24 | 4094.02 | 4100.79 | 4107.55 |
| 39. | 4114.30 | 4121.04 | 4127.77 | 4134.49 | 4141.20 | 4147.89 | 4154.58 | 4161.25 |
| 40. | 4167.91 | 4174.57 | 4181.21 | 4187.84 | 4194.46 | 4201.07 | 4207.67 | 4214.26 |
| 41. | 4220.84 | 4227.41 | 4233.97 | 4240.52 | 4247.06 | 4253.59 | 4260.11 | 4266.61 |
| 42. | 4273.11 | 4279.60 | 4286.08 | 4292.55 | 4299.01 | 4305.46 | 4311.90 | 4318.33 |
| 43. | 4324.75 | 4331.17 | 4337.57 | 4343.96 | 4350.34 | 4356.72 | 4363.08 | 4369.44 |
| 44. | 4375.79 | 4382.12 | 4388.45 | 4394.77 | 4401.08 | 4407.38 | 4413.67 | 4419.95 |
| 45. | 4426.23 | 4432.49 | 4438.75 | 4445.00 | 4451.24 | 4457.47 | 4463.69 | 4469.90 |
| 46. | 4476.10 | 4482.30 | 4488.49 | 4494.66 | 4500.83 | 4506.99 | 4513.15 | 4519.29 |
| 47. | 4525.43 | 4531.56 | 4537.68 | 4543.79 | 4549.89 | 4555.99 | 4562.07 | 4568.15 |
| 48. | 4574.22 | 4580.28 | 4586.34 | 4592.39 | 4598.42 | 4604.45 | 4610.48 | 4616.49 |
| 49. | 4622.50 | 4628.50 | 4634.49 | 4640.47 | 4646.45 | 4652.42 | 4658.38 | 4664.33 |
| 50. | 4670.28 | 4676.22 | 4682.15 | 4688.07 | 4693.99 | 4699.89 | 4705.79 | 4711.69 |
| 51. | 4717.57 | 4723.45 | 4729.32 | 4735.19 | 4741.04 | 4746.89 | 4752.74 | 4758.57 |
| 52. | 4764.40 | 4770.22 | 4776.03 | 4781.84 | 4787.64 | 4793.43 | 4799.22 | 4805.00 |
| 53. | 4810.77 | 4816.53 | 4822.29 | 4828.04 | 4833.79 | 4839.52 | 4845.26 | 4850.98 |
| 54. | 4856.70 | 4862.41 | 4868.11 | 4873.81 | 4879.50 | 4885.18 | 4890.86 | 4896.53 |
| 55. | 4902.19 | 4907.85 | 4913.50 | 4919.15 | 4924.78 | 4930.42 | 4936.04 | 4941.66 |
| 56. | 4947.27 | 4952.88 | 4958.48 | 4964.07 | 4969.66 | 4975.24 | 4980.81 | 4986.38 |
| 57. | 4991.94 | 4997.50 | 5003.05 | 5008.59 | 5014.13 | 5019.66 | 5025.19 | 5030.71 |
| 58. | 5036.22 | 5041.73 | 5047.23 | 5052.72 | 5058.21 | 5063.69 | 5069.17 | 5074.64 |
| 59. | 5080.11 | 5085.57 | 5091.02 | 5096.47 | 5101.91 | 5107.35 | 5112.78 | 5118.20 |
| 60. | 5123.62 | 5129.03 | 5134.44 | 5139.84 | 5145.24 | 5150.63 | 5156.02 | 5161.40 |
| 61. | 5166.77 | 5172.14 | 5177.50 | 5182.86 | 5188.21 | 5193.55 | 5198.89 | 5204.23 |
| 62. | 5209.56 | 5214.88 | 5220.20 | 5225.51 | 5230.82 | 5236.12 | 5241.42 | 5246.71 |
| 63. | 5252.00 | 5257.28 | 5262.56 | 5267.83 | 5273.09 | 5278.35 | 5283.61 | 5288.86 |
| 64. | 5294.10 | 5299.34 | 5304.57 | 5309.80 | 5315.03 | 5320.24 | 5325.46 | 5330.67 |
| 65. | 5335.87 | 5341.07 | 5346.26 | 5351.45 | 5356.63 | 5361.81 | 5366.98 | 5372.15 |
| 66. | 5377.31 | 5382.47 | 5387.62 | 5392.77 | 5397.92 | 5403.05 | 5408.19 | 5413.32 |
| 67. | 5418.44 | 5423.56 | 5428.67 | 5433.78 | 5438.89 | 5443.99 | 5449.08 | 5454.17 |
| 68. | 5459.26 | 5464.34 | 5469.41 | 5474.49 | 5479.55 | 5484.61 | 5489.67 | 5494.72 |
| 69. | 5499.77 | 5504.82 | 5509.85 | 5514.89 | 5519.92 | 5524.94 | 5529.96 | 5534.98 |
| 70. | 5539.99 | 5545.00 | 5550.00 | 5555.00 | 5559.99 | 5564.98 | 5569.96 | 5574.94 |
| 71. | 5579.92 | 5584.89 | 5589.86 | 5594.82 | 5599.78 | 5604.73 | 5609.68 | 5614.62 |
| 72. | 5619.56 | 5624.50 | 5629.43 | 5634.36 | 5639.28 | 5644.20 | 5649.11 | 5654.03 |
| 73. | 5658.93 | 5663.83 | 5668.73 | 5673.62 | 5678.51 | 5683.40 | 5688.28 | 5693.15 |
| 74. | 5698.03 | 5702.89 | 5707.76 | 5712.62 | 5717.47 | 5722.32 | 5727.17 | 5732.02 |
| 75. | 5736.85 | 5741.69 | 5746.52 | 5751.35 | 5756.17 | 5760.99 | 5765.80 | 5770.62 |
| 76. | 5775.42 | 5780.22 | 5785.02 | 5789.82 | 5794.61 | 5799.40 | 5804.18 | 5808.96 |
| 77. | 5813.73 | 5818.50 | 5823.27 | 5828.04 | 5832.80 | 5837.55 | 5842.30 | 5847.05 |
| 78. | 5851.79 | 5856.53 | 5861.27 | 5866.00 | 5870.73 | 5875.46 | 5880.18 | 5884.90 |
| 79. | 5889.61 | 5894.32 | 5899.03 | 5903.73 | 5908.43 | 5913.12 | 5917.81 | 5922.50 |
| 80. | 5927.18 | 5931.86 | 5936.54 | 5941.21 | 5945.88 | 5950.55 | 5955.21 | 5959.87 |
| 81. | 5964.52 | 5969.17 | 5973.82 | 5978.46 | 5983.10 | 5987.74 | 5992.37 | 5997.00 |

TABLE 7-continued

The outer radius of each subzone for a 2.5D, 15-mm, 8-level diffractive lens.

| Zone# | Subzone # | | | | | | | |
|---|---|---|---|---|---|---|---|---|
| | 1 | 2 | 3 | 4 | 5 | 6 | 7 | 8 |
| 82. | 6001.62 | 6006.25 | 6010.87 | 6015.48 | 6020.09 | 6024.70 | 6029.30 | 6033.90 |
| 83. | 6038.50 | 6043.10 | 6047.69 | 6052.27 | 6056.86 | 6061.44 | 6066.01 | 6070.58 |
| 84. | 6075.15 | 6079.72 | 6084.28 | 6088.84 | 6093.40 | 6097.95 | 6102.50 | 6107.05 |
| 85. | 6111.59 | 6116.13 | 6120.66 | 6125.19 | 6129.72 | 6134.25 | 6138.77 | 6143.29 |
| 86. | 6147.80 | 6152.32 | 6156.83 | 6161.33 | 6165.83 | 6170.33 | 6174.83 | 6179.32 |
| 87. | 6183.81 | 6188.30 | 6192.78 | 6197.26 | 6201.73 | 6206.21 | 6210.68 | 6215.14 |
| 88. | 6219.61 | 6224.07 | 6228.52 | 6232.98 | 6237.43 | 6241.87 | 6246.32 | 6250.76 |
| 89. | 6255.20 | 6259.63 | 6264.06 | 6268.49 | 6272.92 | 6277.34 | 6281.76 | 6286.18 |
| 90. | 6290.59 | 6295.00 | 6299.40 | 6303.81 | 6308.21 | 6312.61 | 6317.00 | 6321.39 |
| 91. | 6325.78 | 6330.17 | 6334.55 | 6338.93 | 6343.30 | 6347.68 | 6352.05 | 6356.41 |
| 92. | 6360.78 | 6365.14 | 6369.50 | 6373.85 | 6378.21 | 6382.55 | 6386.90 | 6391.24 |
| 93. | 6395.58 | 6399.92 | 6404.26 | 6408.59 | 6412.92 | 6417.24 | 6421.57 | 6425.89 |
| 94. | 6430.20 | 6434.52 | 6438.83 | 6443.14 | 6447.44 | 6451.74 | 6456.04 | 6460.34 |
| 95. | 6464.63 | 6468.93 | 6473.21 | 6477.50 | 6481.78 | 6486.06 | 6490.34 | 6494.61 |
| 96. | 6498.88 | 6503.15 | 6507.42 | 6511.68 | 6515.94 | 6520.20 | 6524.45 | 6528.71 |
| 97. | 6532.95 | 6537.20 | 6541.44 | 6545.69 | 6549.92 | 6554.16 | 6558.39 | 6562.62 |
| 98. | 6566.85 | 6571.07 | 6575.29 | 6579.51 | 6583.73 | 6587.94 | 6592.15 | 6596.36 |
| 99. | 6600.57 | 6604.77 | 6608.97 | 6613.17 | 6617.36 | 6621.56 | 6625.75 | 6629.93 |
| 100. | 6634.12 | 6638.30 | 6642.48 | 6646.65 | 6650.83 | 6655.00 | 6659.17 | 6663.33 |
| 101. | 6667.50 | 6671.66 | 6675.81 | 6679.97 | 6684.12 | 6688.27 | 6692.42 | 6696.57 |
| 102. | 6700.71 | 6704.85 | 6708.99 | 6713.12 | 6717.25 | 6721.38 | 6725.51 | 6729.64 |
| 103. | 6733.76 | 6737.88 | 6742.00 | 6746.11 | 6750.22 | 6754.33 | 6758.44 | 6762.54 |
| 104. | 6766.65 | 6770.75 | 6774.84 | 6778.94 | 6783.03 | 6787.12 | 6791.21 | 6795.29 |
| 105. | 6799.37 | 6803.46 | 6807.53 | 6811.61 | 6815.68 | 6819.75 | 6823.82 | 6827.88 |
| 106. | 6831.95 | 6836.01 | 6840.07 | 6844.12 | 6848.17 | 6852.23 | 6856.27 | 6860.32 |
| 107. | 6864.36 | 6868.41 | 6872.44 | 6876.48 | 6880.52 | 6884.55 | 6888.58 | 6892.60 |
| 108. | 6896.63 | 6900.65 | 6904.67 | 6908.69 | 6912.71 | 6916.72 | 6920.73 | 6924.74 |
| 109. | 6928.74 | 6932.75 | 6936.75 | 6940.75 | 6944.75 | 6948.74 | 6952.73 | 6956.72 |
| 110. | 6960.71 | 6964.70 | 6968.68 | 6972.66 | 6976.64 | 6980.62 | 6984.59 | 6988.56 |
| 111. | 6992.53 | 6996.50 | 7000.46 | 7004.43 | 7008.39 | 7012.35 | 7016.30 | 7020.26 |
| 112. | 7024.21 | 7028.16 | 7032.10 | 7036.05 | 7039.99 | 7043.93 | 7047.87 | 7051.81 |
| 113. | 7055.74 | 7059.67 | 7063.60 | 7067.53 | 7071.46 | 7075.38 | 7079.30 | 7083.22 |
| 114. | 7087.14 | 7091.05 | 7094.96 | 7098.87 | 7102.78 | 7106.69 | 7110.59 | 7114.49 |
| 115. | 7118.39 | 7122.29 | 7126.18 | 7130.08 | 7133.97 | 7137.86 | 7141.74 | 7145.63 |
| 116. | 7149.51 | 7153.39 | 7157.27 | 7161.15 | 7165.02 | 7168.89 | 7172.76 | 7176.63 |
| 117. | 7180.49 | 7184.36 | 7188.22 | 7192.08 | 7195.94 | 7199.79 | 7203.64 | 7207.50 |
| 118. | 7211.35 | 7215.19 | 7219.04 | 7222.88 | 7226.72 | 7230.56 | 7234.40 | 7238.23 |
| 119. | 7242.06 | 7245.90 | 7249.72 | 7253.55 | 7257.38 | 7261.20 | 7265.02 | 7268.84 |
| 120. | 7272.65 | 7276.47 | 7280.28 | 7284.09 | 7287.90 | 7291.71 | 7295.51 | 7299.32 |
| 121. | 7303.12 | 7306.91 | 7310.71 | 7314.51 | 7318.30 | 7322.09 | 7325.88 | 7329.67 |
| 122. | 7333.45 | 7337.23 | 7341.01 | 7344.79 | 7348.57 | 7352.35 | 7356.12 | 7359.89 |
| 123. | 7363.66 | 7367.43 | 7371.19 | 7374.96 | 7378.72 | 7382.48 | 7386.24 | 7389.99 |
| 124. | 7393.75 | 7397.50 | 7401.25 | 7405.00 | 7408.74 | 7412.49 | 7416.23 | 7419.97 |
| 125. | 7423.71 | 7427.45 | 7431.18 | 7434.92 | 7438.65 | 7442.38 | 7446.11 | 7449.83 |
| 126. | 7453.56 | 7457.28 | 7461.00 | 7464.72 | 7468.43 | 7472.15 | 7475.86 | 7479.57 |
| 127. | 7483.28 | 7486.99 | 7490.69 | 7494.40 | 7498.10 | 7501.80 | 7505.50 | 7509.19 |

We claim:

1. An adjustable focusing electrically controllable electro-active lens comprising:

a liquid crystal layer positioned between a pair of opposite Fresnel zone patterned electrodes, wherein each Fresnel zone patterned electrode is configured to have voltage applied thereto to form M electrode zones, each electrode zone having L individually addressable electrode subzones, wherein the same voltage is applied to electrodes in each subzone, wherein each electrode subzone is positioned between the liquid crystal layer and a surface of a transparent substrate, wherein both M and L are positive integers greater than or equal to two, and wherein the electrode subzones in the opposite Fresnel zone patterned electrodes are interleaved; and an electrical control electrically connected to the individually addressable electrode subzones in the pair of Fresnel zone patterned electrodes.

2. The lens of claim 1, wherein the electrode subzones in the opposite Fresnel patterned electrodes are interleaved so that there is no radial gap between radially adjacent interleaving subzones in the opposite Fresnel zone patterned electrodes.

3. The lens of claim 1, wherein the electrical control changes the voltage applied to one or more electrodes to change a number of individually addressable electrodes in each electrode subzone to which the same voltage is applied.

4. The lens of claim 3, wherein changing the number of individually addressable electrodes in each electrode subzone changes a focal length f of the lens.

5. The lens of claim 1, wherein each mth electrode subzone includes a number of individually addressable electrodes equal to an area of the electrode zone divided by an integer greater than or equal to L, wherein the area of the electrode zone is calculated using the equation: $r_m^2 + f^2 = (f + m\lambda)^2$, where $r_m$ is the radius of the mth electrode subzone, f is design focal length and $\lambda$ is a design wavelength.

6. The lens of claim 1, wherein each electrode zone has the same area.

7. The lens of claim 1, wherein, in each of the M electrode zones, the radial widths of each of the L individually addressable electrode subzones decreases as the radial position of the individually addressable electrode subzones increases.

8. An adjustable focusing electrically controllable electro-active lens comprising:
- a liquid crystal layer positioned between a pair of transparent substrates;
- a Fresnel zone patterned electrode configured to have voltage applied thereto from M electrode zones, each electrode zone having L individually addressable electrode rings, wherein each electrode ring is positioned between the liquid crystal layer and the inward-facing surface of the first transparent substrate, wherein both M and L are positive integers greater than or equal to two, wherein, in each of the M electrode zones, the radial widths of each of the L individually addressable electrode rings decreases as the radial position of the individually addressable electrode ring increases and wherein odd numbered individually addressable electrode rings are placed in one layer positioned between the liquid crystal layer and the inward-facing surface of the first transparent substrate and even numbered individually addressable electrode rings are placed in the conductive layer positioned between the liquid crystal layer and the inward-facing surface of the second transparent substrate; and
- a conductive layer between the liquid crystal layer and the inward-facing surface of the second transparent substrate.

* * * * *